(12) United States Patent
Ebbes

(10) Patent No.: US 10,874,253 B2
(45) Date of Patent: *Dec. 29, 2020

(54) METHOD AND APPARATUS FOR MULTI-FUEL GRILL

(71) Applicant: Osvaldo Emilio Ebbes, San Carlos, CA (US)

(72) Inventor: Osvaldo Emilio Ebbes, San Carlos, CA (US)

(*) Notice: Subject to any disclaimer, the term of this patent is extended or adjusted under 35 U.S.C. 154(b) by 143 days.

This patent is subject to a terminal disclaimer.

(21) Appl. No.: 16/238,952

(22) Filed: Jan. 3, 2019

(65) Prior Publication Data

US 2020/0297161 A1    Sep. 24, 2020

Related U.S. Application Data

(63) Continuation-in-part of application No. 15/283,229, filed on Sep. 30, 2016, now Pat. No. 10,206,537.

(60) Provisional application No. 62/235,832, filed on Oct. 1, 2015.

(51) Int. Cl.
*A47J 37/07* (2006.01)
*A47J 37/04* (2006.01)

(52) U.S. Cl.
CPC ....... *A47J 37/0713* (2013.01); *A47J 37/0786* (2013.01); *A47J 37/04* (2013.01); *A47J 2037/0795* (2013.01)

(58) Field of Classification Search
CPC ........ A47J 37/00; A47J 37/04; A47J 37/0786; A47J 37/0704; F24C 15/10
See application file for complete search history.

(56) References Cited

U.S. PATENT DOCUMENTS

| 4,092,973 | A | 6/1978 | Bernazzani |
| 5,421,318 | A | 6/1995 | Unruh |
| 5,878,739 | A | 3/1999 | Guidry |
| 5,996,572 | A | 12/1999 | Ilagan |
| 6,000,389 | A | 12/1999 | Alpert |
| 6,050,177 | A * | 4/2000 | Lassig, Jr. ............. A47J 37/041 126/25 R |
| 6,176,233 | B1 | 1/2001 | Babington |
| 10,772,467 | B2 * | 9/2020 | Dahle ................ A47J 37/0713 |
| 2004/0112226 | A1 | 6/2004 | Johnston |
| 2007/0221191 | A1 | 9/2007 | O'Brien |
| 2013/0206015 | A1 * | 8/2013 | Jacoby .................... A47J 37/07 99/330 |
| 2014/0174427 | A1 * | 6/2014 | Yuen .................... A47J 37/067 126/25 R |
| 2014/0261372 | A1 * | 9/2014 | Knight .................. F24C 15/322 126/21 A |
| 2014/0352551 | A1 * | 12/2014 | Ducate ................ A47J 37/0713 99/339 |
| 2015/0265099 | A1 | 9/2015 | Coffie |
| 2017/0164783 | A1 * | 6/2017 | Sauerwein .......... A47J 37/0786 |
| 2018/0296034 | A1 * | 10/2018 | Wenzel ............... A47J 37/0652 |

(Continued)

FOREIGN PATENT DOCUMENTS

| KR | 20030091224 | 12/2002 |
| KR | 20140013856 | 2/2014 |

*Primary Examiner* — David J Laux
*Assistant Examiner* — Nikhil P Mashruwala
(74) *Attorney, Agent, or Firm* — Heimlich Law, PC; Alan Heimlich Esq.

(57) ABSTRACT

A Method and Apparatus for Multi-Fuel Grill have been disclosed. In one version an attached fire box holds fuel.

20 Claims, 35 Drawing Sheets

"SARAH'S BBQ-GRILLS, CHARCOAL or GAS"

(56) References Cited

U.S. PATENT DOCUMENTS

2019/0256338 A1* 8/2019 Moss ................. A47J 37/0704
2019/0293296 A1* 9/2019 Measom ............. A47J 37/0786
2019/0374065 A1* 12/2019 Hancock ............ A47J 37/0713

* cited by examiner

"SARAH'S BBQ-GRILLS, CHARCOAL or GAS"

"SARAH'S BBQ-GRILLS, CHARCOAL or GAS"

BASE

Removable Holder and cutting board to be used in front of grill area

Front Door for BBQ grill area

Log lighter with mixing chamber to be used inside the firebox

Log lighter with Mixing chamber ated Oct. 1, 2015, and
METHOD AND APPARATUS FOR MULTI-FUEL GRILL

RELATED APPLICATION

The present Application for Patent claims priority to U.S. patent application Ser. No. 62/235,832 titled "Method and Apparatus for Multi-Fuel Grill" filed Oct. 1, 2015, and which is hereby incorporated herein by reference. The present Application for Patent claims priority to U.S. patent application Ser. No. 15/283,229 titled "Method and Apparatus for Multi-Fuel Grill" filed Sep. 30, 2016, pending, and which is hereby incorporated herein by reference.

FIELD OF THE INVENTION

The present invention pertains to grills. More particularly, the present invention relates to a Method and Apparatus for Multi-Fuel Grill.

BACKGROUND OF THE INVENTION

Grills are popular for cooking various foods.
Various foods are best prepared at different temperatures and using different heating methods.
This presents a technical problem for which a technical solution is needed using a technical means.

BRIEF DESCRIPTION OF THE DRAWINGS

The invention is illustrated by way of example and not limitation in the figures of the accompanying drawings. Same numbered items are not necessarily alike.

The accompanying Figures illustrate various embodiments of the invention.

DETAILED DESCRIPTION

Figure 1:
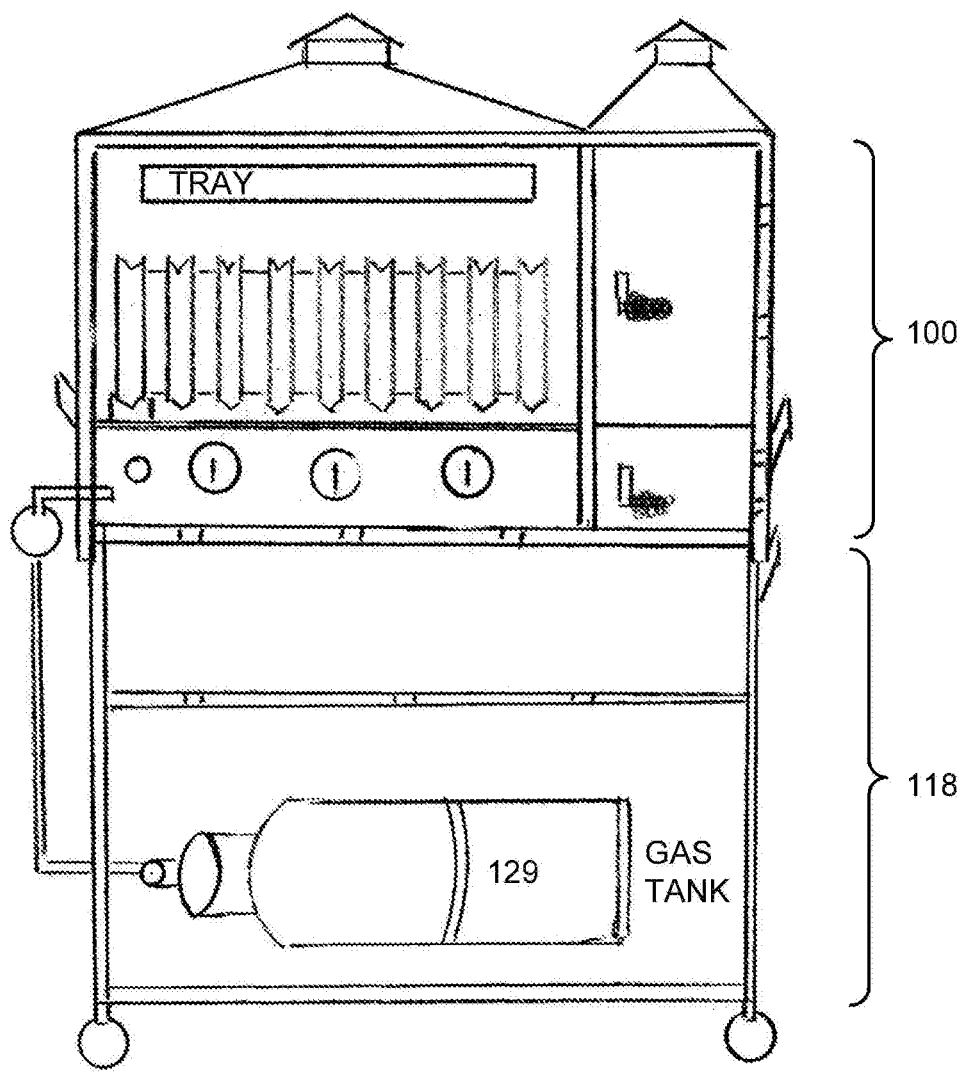
FIG. 1 illustrates, generally at 99, one embodiment of the invention.

A Method and Apparatus for Multi-Fuel Grill is disclosed.

While embodiments of the invention may illustrate a gas tank on its side, it is to be understood that the gas tank can be built for horizontal placement for gas delivery or more likely a standard propane gas tank would be vertically placed so that only gas vapor would exit from the tank valve assembly. That is, embodiments having the gas tank upright are also possible.

When referring to the non-gas fuel, reference is made primarily to charcoal. What is to be appreciated is that charcoal is simply representative of the non-gas fuel. The non-gas fuel can be, for example, but not limited to, charcoal, logs, wood, artificial logs, etc. or any suitable combustible source of heat for cooking.

Embodiments of the invention are sometimes referred to as "Sarah's".

Description of some of the figure items for "SARAH'S BBQ-GRILLS, CHARCOAL OR GAS".

Description for "Sarah's BBQ-Grill, charcoal or gas"
100—Frame Grill
101—V-shaped grates
102—Pasador (tool) 1 with angle and blade at the end 103—Pasador (tool) 2 straight with blade at the end
104—Opening for transfer of charcoal to grill area when the food is ready to cook
105—Bricks for base and sides of frame grill
106—Tray Holder
107—Level 1 and 2 V-shaped grates (one for gas and the other for charcoal)
108—Horizontal door (put the door down) protection to prevent hot coals (charcoal) from falling out
109—Small door for fire box (preventing charcoal from falling out)
110—Big door for fire box (safety reason and hold the heat from charcoal)
111—Hinges
112—Locks for fire box door and horizontal door
113—Handles
114—Grease collector: flat, horizontal and removable for cleaning.
115—Grease can collector for 114, removable
116—Small roof and optional chimney for fire box from charcoal (it does open to the side, has 2 hinges and 1 handle)
117—Big roof and optional chimney for cooking area (it does open to the back, has 2 hinges & 1 handle)
118—Base or table for grill
119—Open space storage for grill gas box burner
120—Open to storage gas tank
121—Wheels
122—Burners
123—Control valves
124—Ignition
125—Valve connector to a gas tank
126—Metal box for burners
127—Tray holder for single long grill briquettes
128—Ceramic grill briquettes single, long units with sides allowing rotation (more usage)
129—Gas tank
130—Handles for grill frame
131—Hose connection to gas
132—The full length of gas supply hose
133—Regulator connection into regulator
134—Backside of connections nut to fitting
135—Connection nut to tank valve
136—Tank valve to cylinder
137—Charcoal flat (waving surface with handles e.g. fan) blowing air (metal and light)
138—Cutting board detachable with 2 levels.
139—Shovel for cleaning fire box (ash shovel)
140—A-B-C-D-E-F-G-H-I=metal sides and surfaces thicker than the others.
141—Metal base to hold bricks (laminate)
142—Cross bars metal to hold metal base (laminate, base for bricks)
143—Metal base for storage gas tank
144—Metal base for storage of gas burner assembly
145—Up & down for V-shaped grates grill (portable & detached)

FIG. 1 shows, generally at 99, one embodiment of the invention. At 129 is a gas tank within a base or table for grill 118. At 100 is a frame grill housing various components as described herein.

Figure 2:
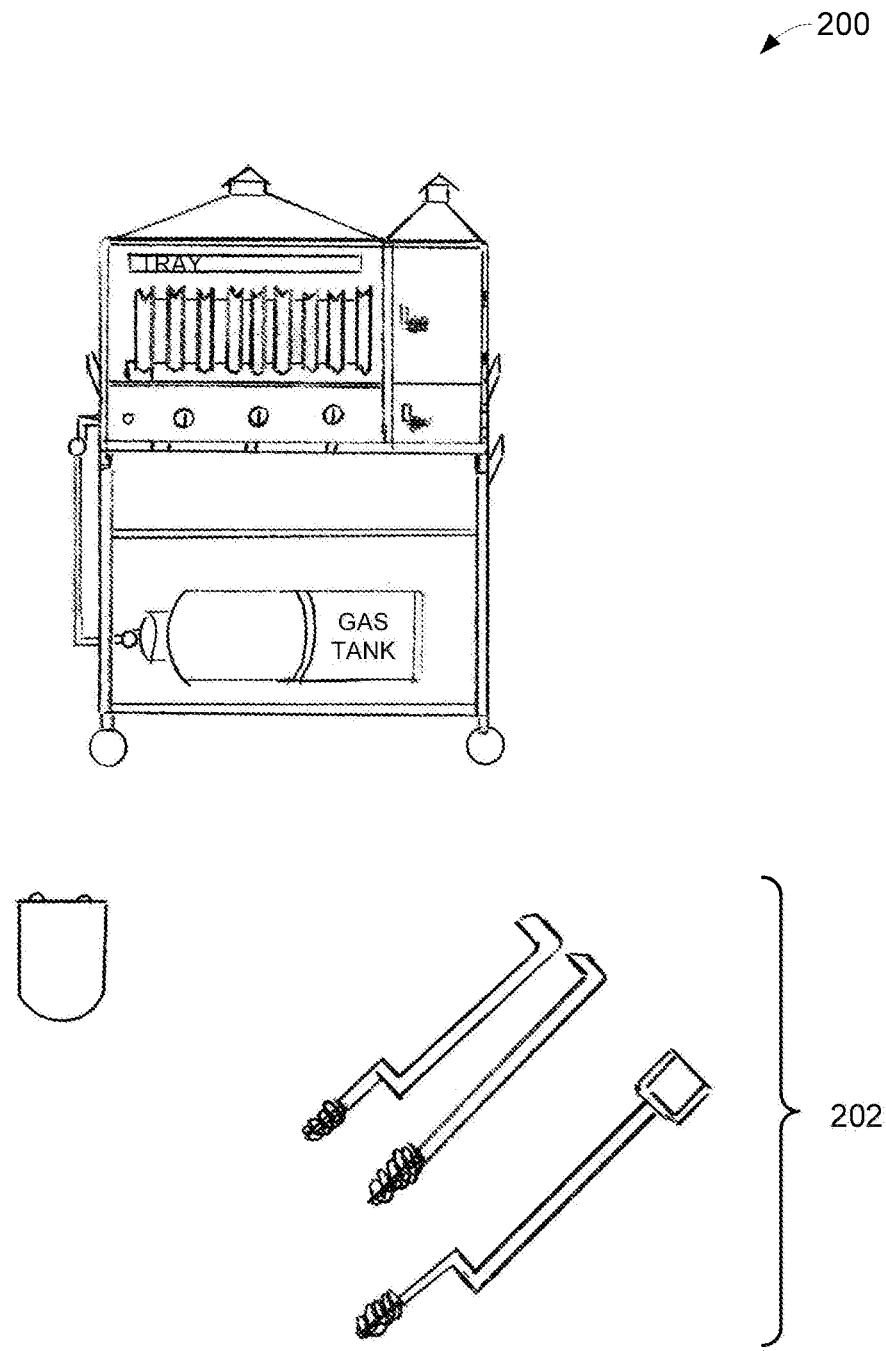
FIG. 2 illustrates, generally at 200, one embodiment of the invention.

FIG. 2 shows, generally at 200, one embodiment of the invention. At 202 are various implements as described herein.

Figure 3:
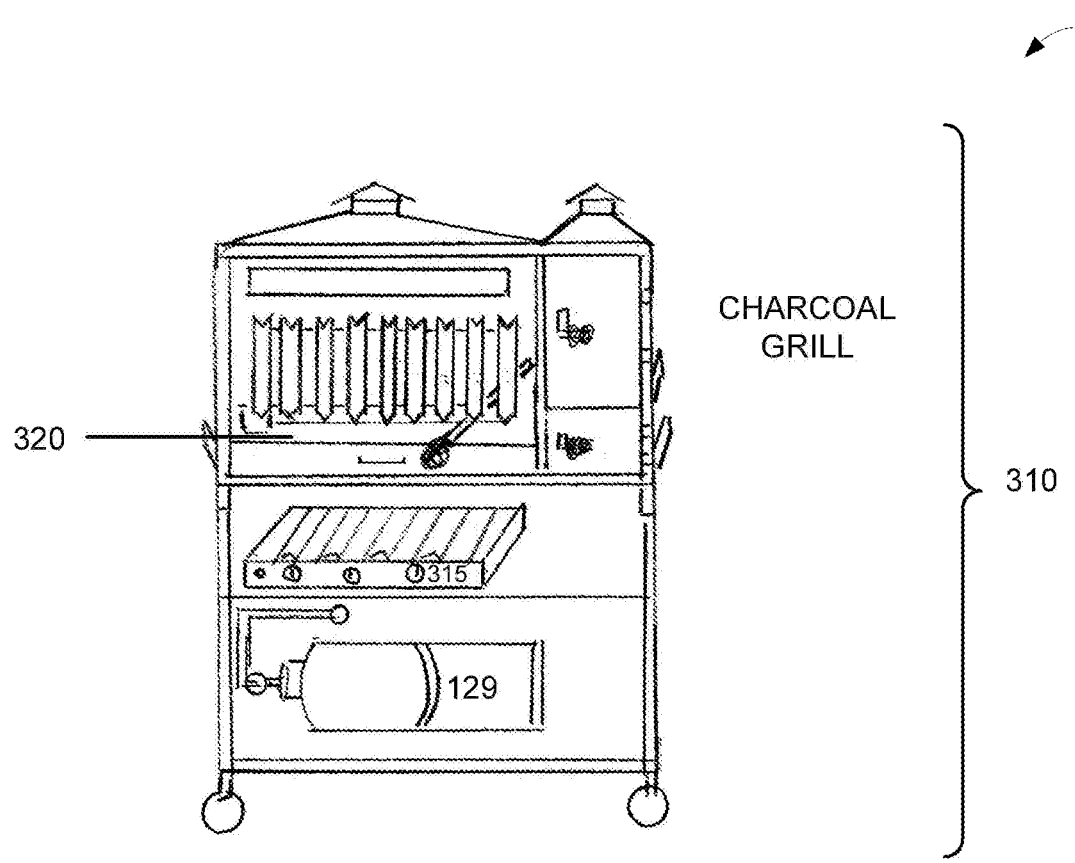
FIG. 3 illustrates, generally at 300, a charcoal grill embodiment and a gas grill embodiment.
Figure 3:
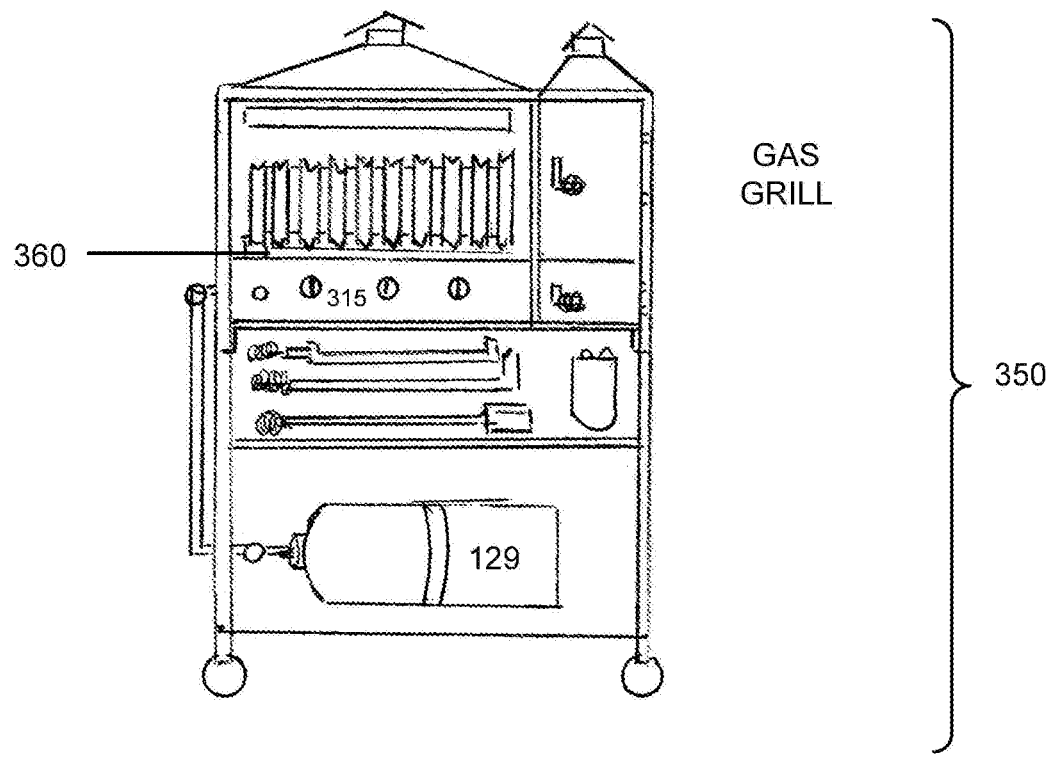

FIG. 3 shows, generally at 300, one charcoal grill embodiment 310 and one gas grill embodiment 350. As can be seen in the charcoal grill embodiment 310 the gas tank 129 is not connected to the gas burner assembly 315 (having 122, 123, 124, 125, 126, 127, 128 disclosed in another figure). Also the gas burner assembly 315 is stored below the main grill area 320 (where charcoal will be located when using charcoal as the fuel). As can be seen in the gas grill embodiment 350 the gas tank 129 is connected to the gas burner assembly 315 (having 122, 123, 124, 125, 126, 127, 128 disclosed in another figure). Also the gas burner assembly 315 is now on the surface of the main grilling area 360 (charcoal not on the surface).

Figure 4:
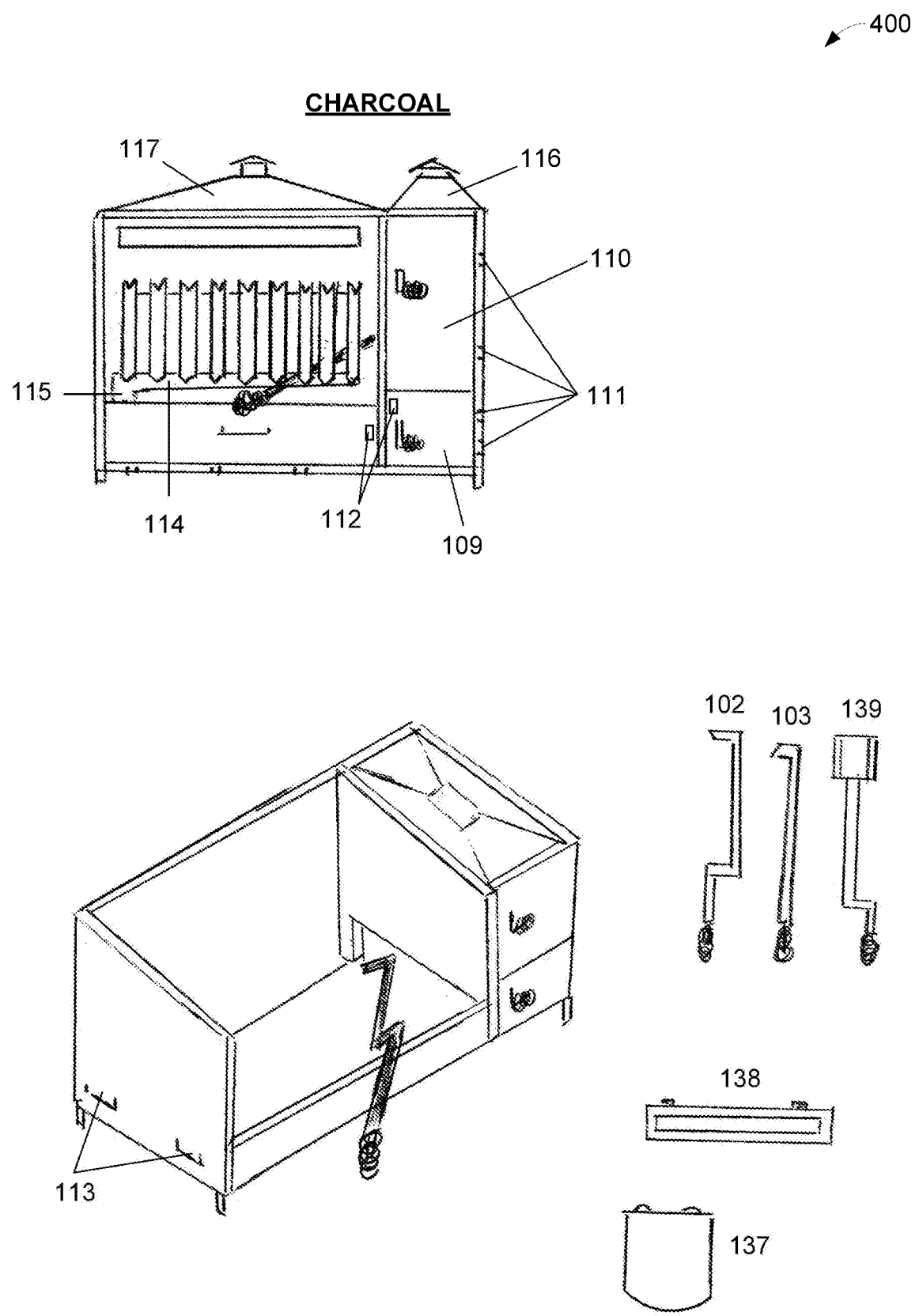
FIG. 4 illustrates, generally at 400, various embodiments of the invention when charcoal is used as the fuel, as well as implements.

FIG. 4 shows, generally at 400, various embodiments of the invention when charcoal is used as the fuel, as well as implements. The Description for "Sarah's BBQ-Grill, charcoal or gas" as noted above shows the various components.

Figure 5:
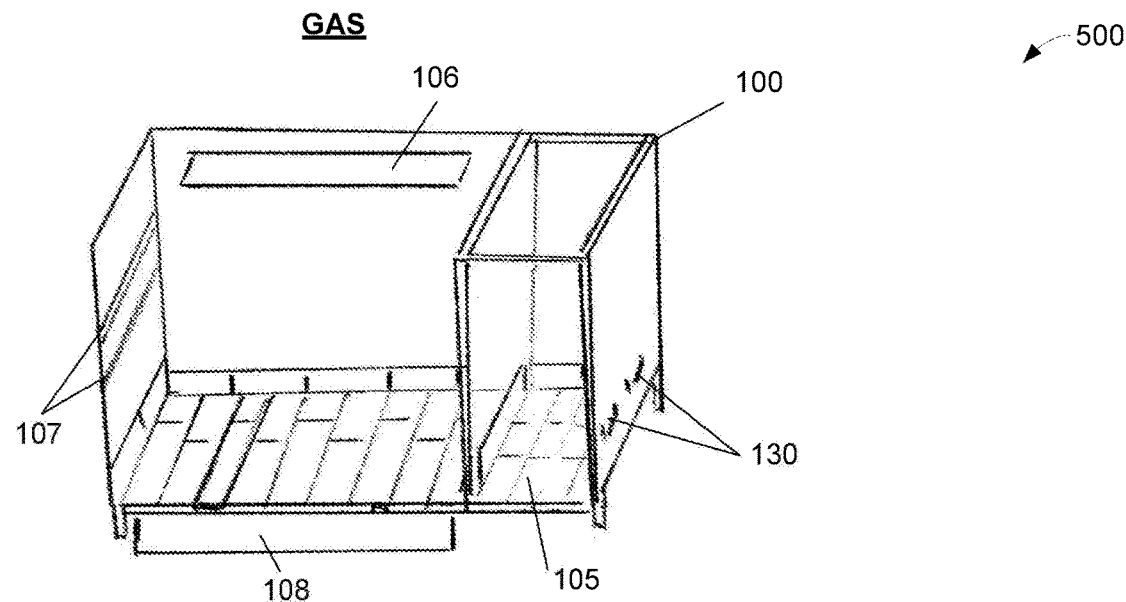
FIG. 5 illustrates, generally at 500, various embodiments of the invention when gas is used as the fuel.
Figure 5:
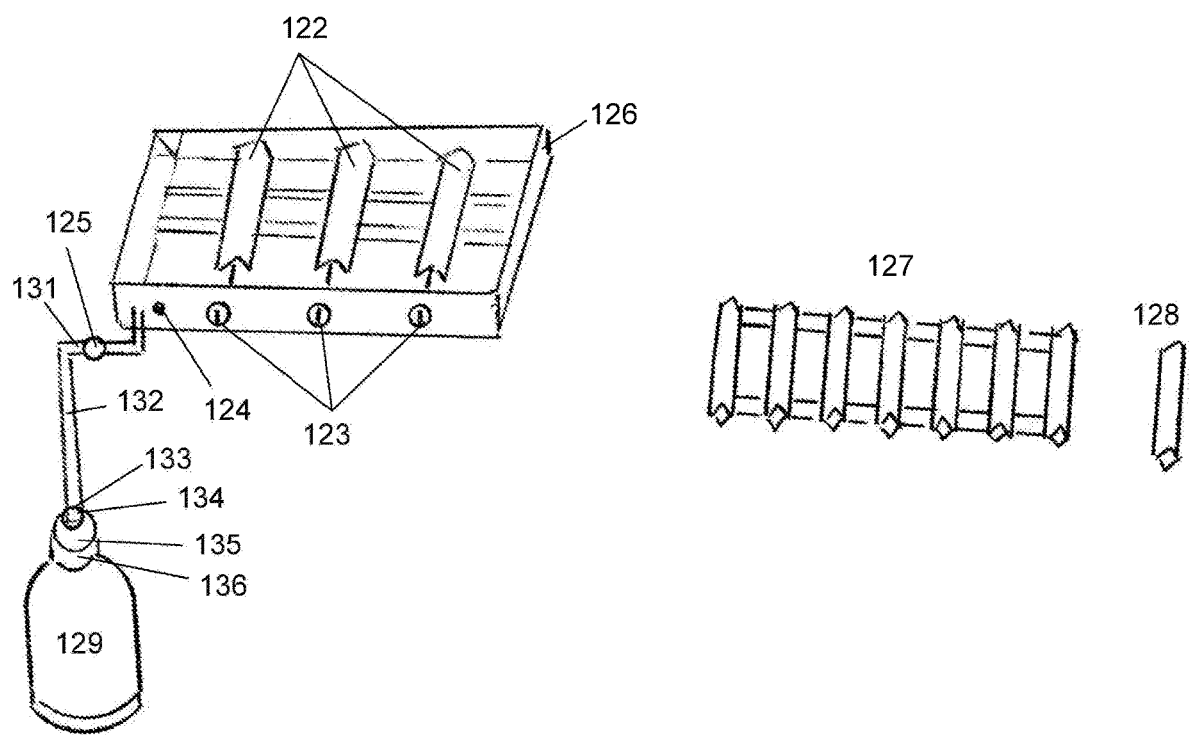

FIG. 5 shows, generally at 500, various embodiments of the invention when gas is used as the fuel. The Description for "Sarah's BBQ-Grill, charcoal or gas" as noted above shows the various components.

Figure 6:
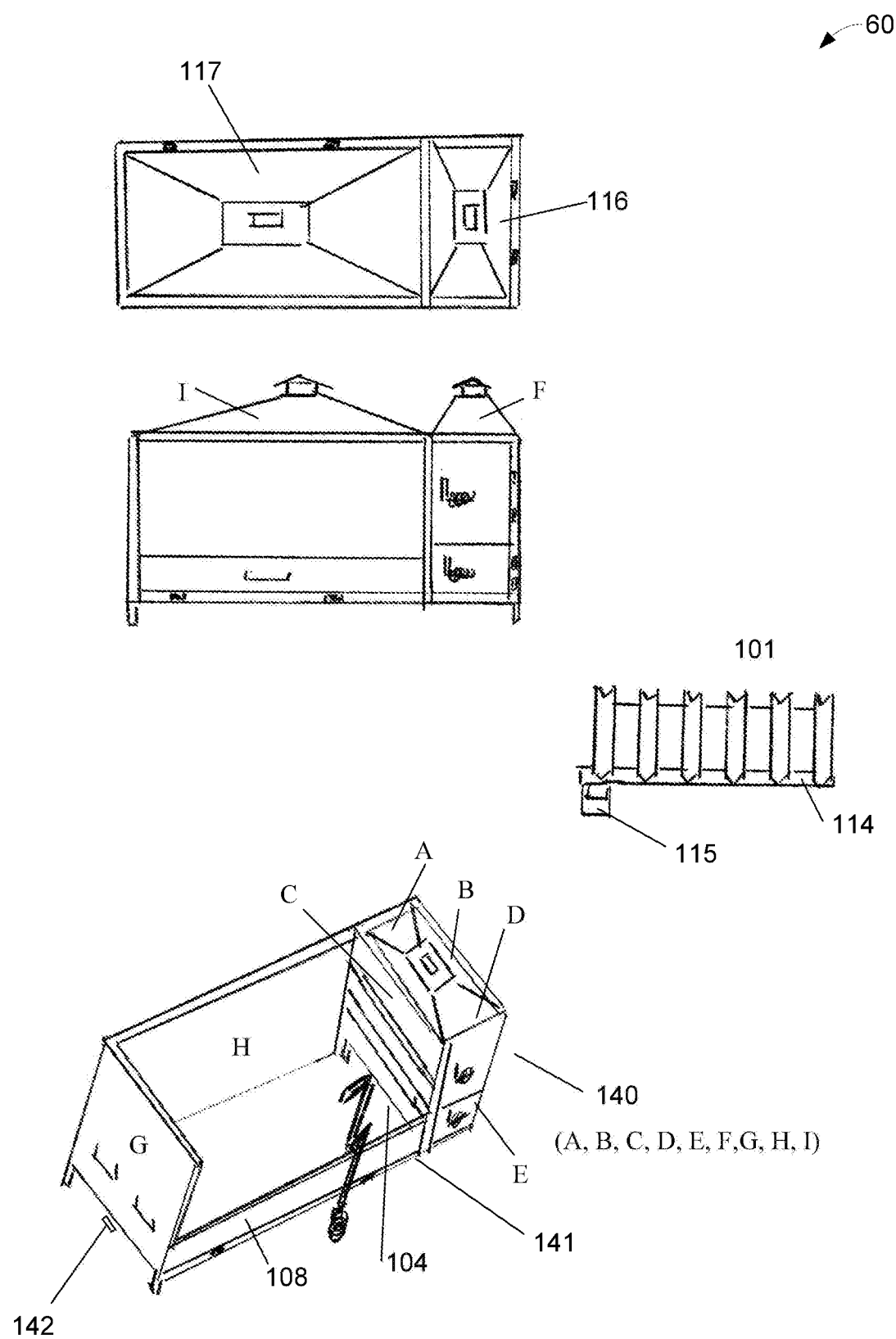
FIG. 6 illustrates, generally at 600, various embodiments of the invention.

FIG. 6 shows, generally at 600, various embodiments of the invention. The Description for "Sarah's BBQ-Grill, charcoal or gas" as noted above shows the various components.

Figure 7:
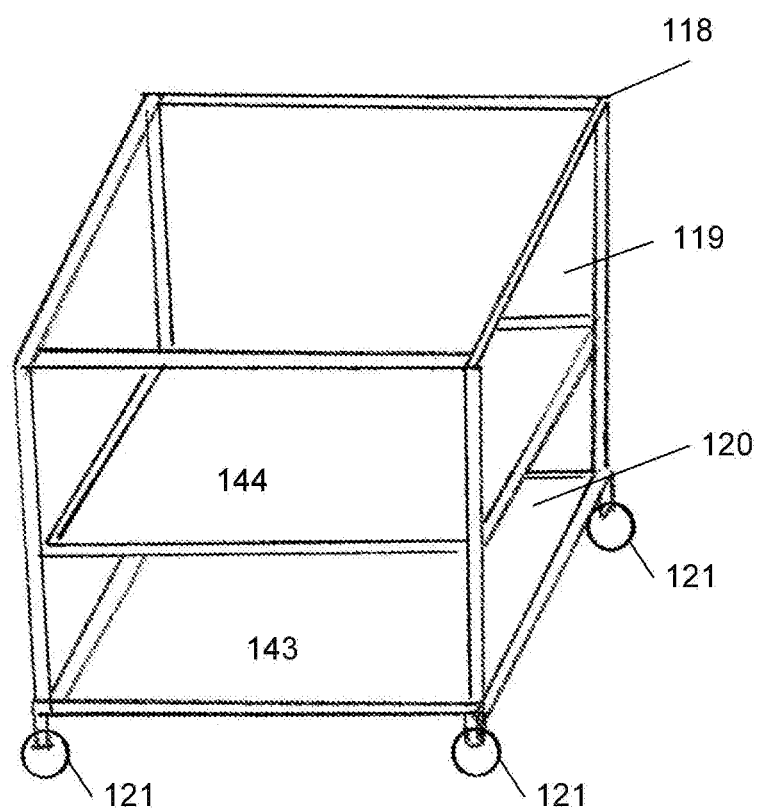
FIG. 7 illustrates, generally at 700, a base.

FIG. 7 shows, generally at 700, a base. The Description for "Sarah's BBQ-Grill, charcoal or gas" as noted above shows the various components.

Figure 8:
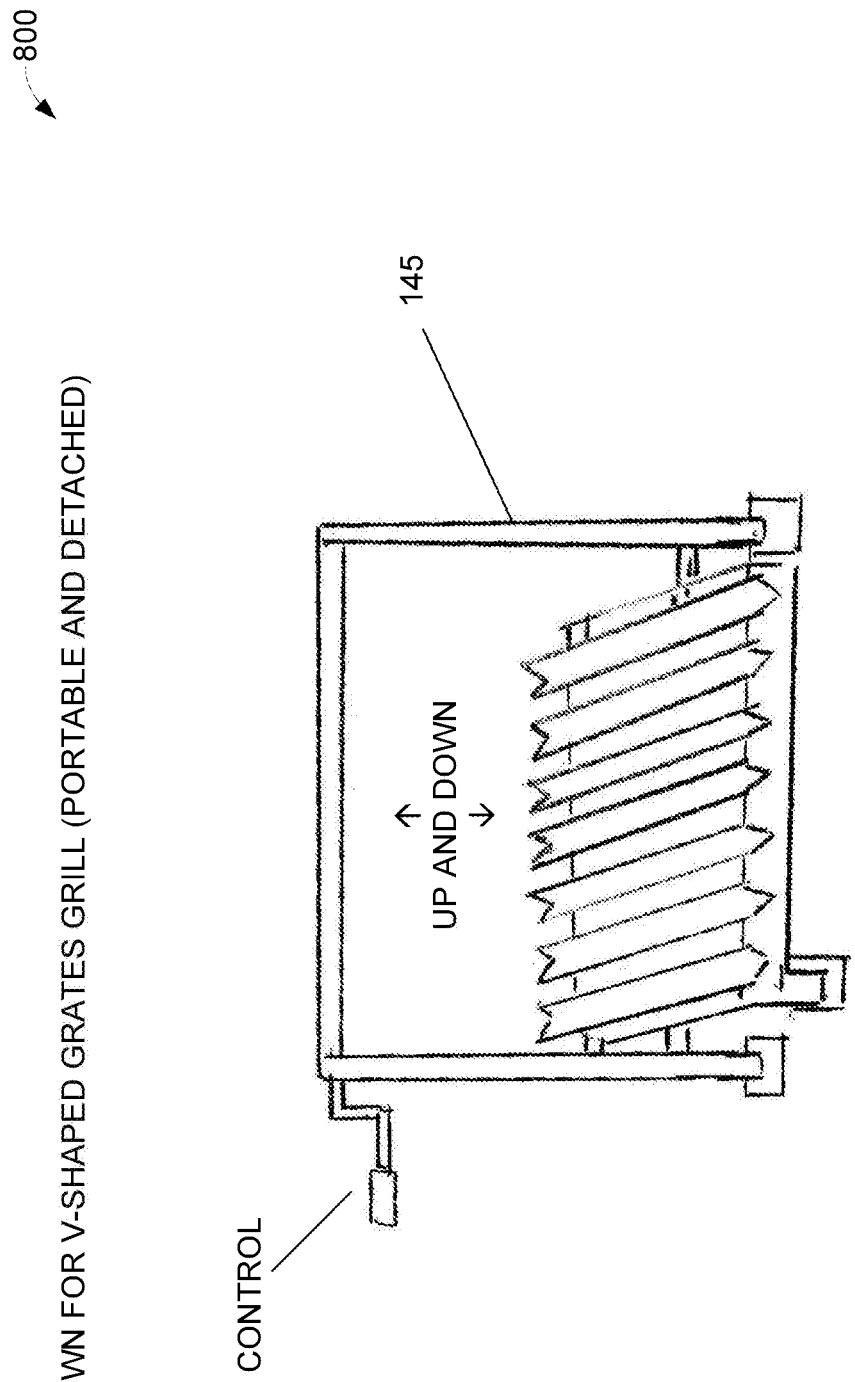
FIG. 8 illustrates, generally at 800, an up and down motion for the grates.

FIG. 8 shows, generally at 800, an up and down motion for the grates. The Description for "Sarah's BBQ-Grill, charcoal or gas" as noted above shows the various components.

Figure 9:
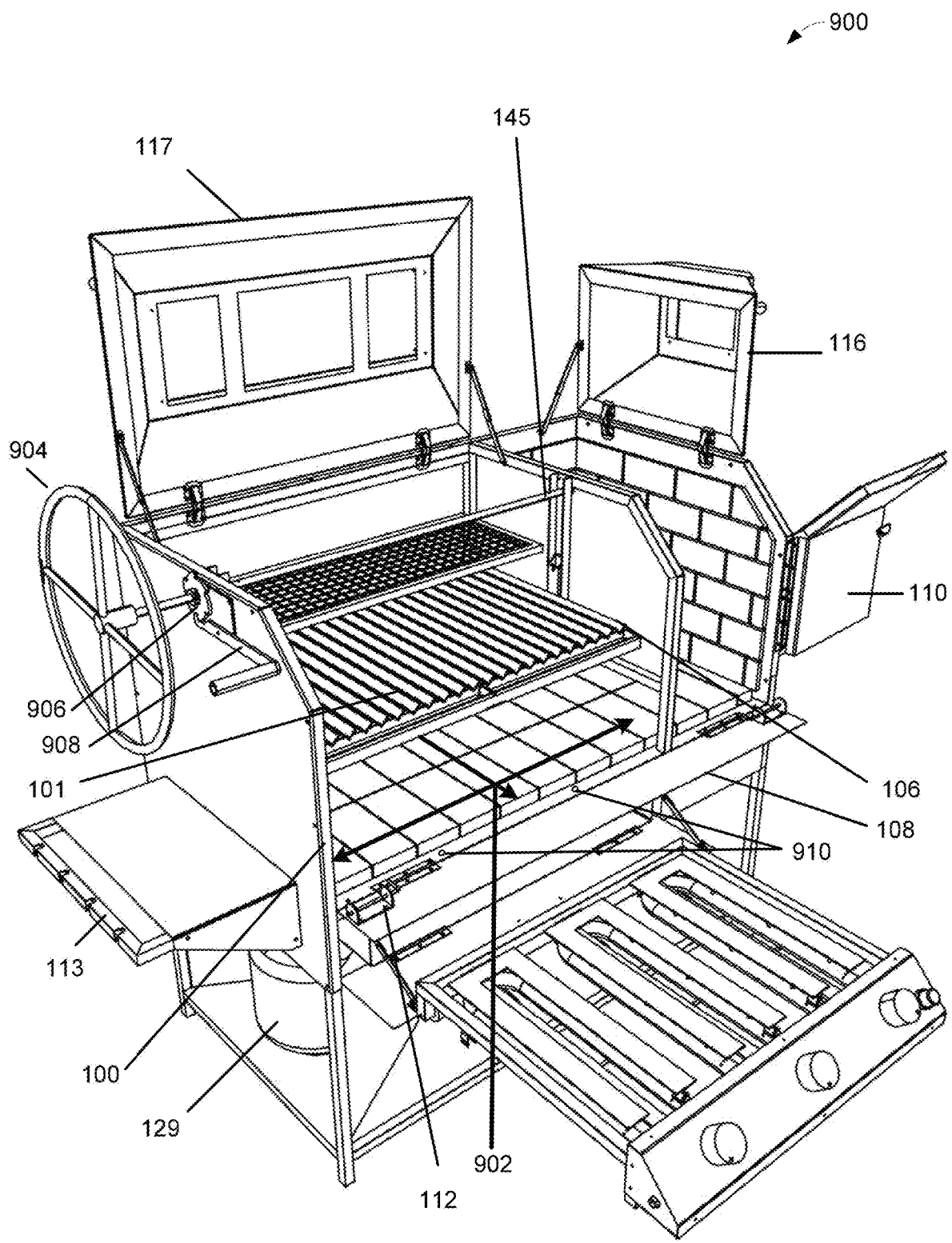
FIG. 9 illustrates, generally at 900, an open view of one embodiment of the invention.

FIG. 9 illustrates, generally at 900, an open view of one embodiment of the grilling apparatus. At 902 is a main grilling area shown here lined with bricks which extend across the front and to the rear of the grilling apparatus. At 904 is crank mechanism handle, at 906 a ratchet assembly, and at 908 a releaseable pawl. At 910 are openings, for example, holes or slots in the edge support of the grilling apparatus. These openings can be used to hook a detachable shelf, cutting board, etc. in front of the grill area 902. At 100 is a frame for the grill, at 129 is a gas tank for use when using the gas burner unit, at 101 are the V-shaped grates, at 112 is a locking mechanism for the firebox door and horizontal door, here the horizontal door 108 is shown as a single unit, at 106 is the tray holder, at 110 is a fire box door having a portion vertical and a portion slanted, at 116 is a roof for the main fire box, at 145 is the up and down crank mechanism, at 117 the openable roof for the main grilling enclosure, at 113 is a side shelf and handle.

Figure 10:
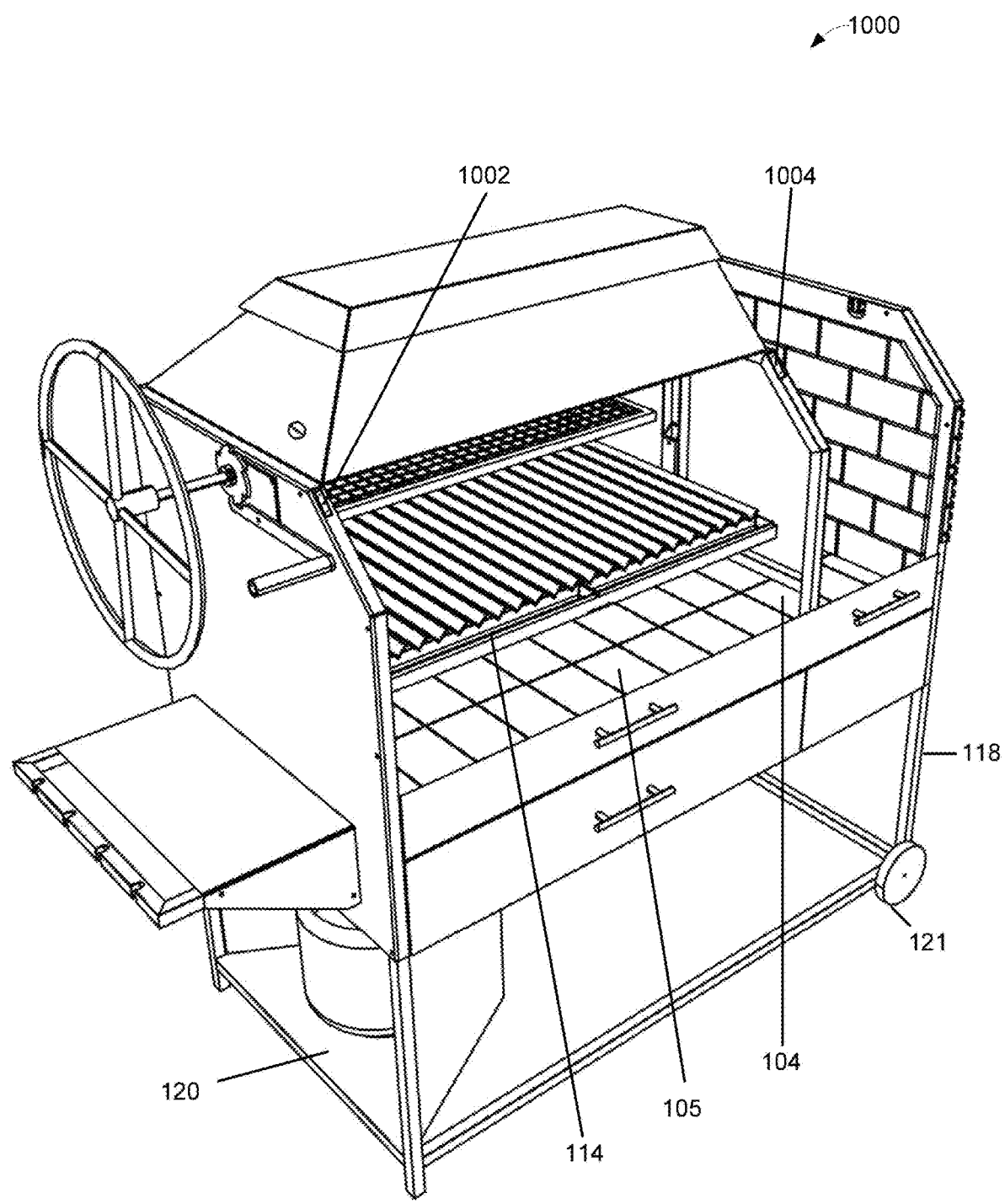
FIG. 10 illustrates, generally at 1000, a closed view of one embodiment of the invention.

FIG. 10 illustrates, generally at 1000, a closed view of one embodiment of the invention. At 120 is an open area for storing a gas tank, at 114 is a grease collector, at 105 are bricks lining the bottom of the main grilling area, at 104 is the opening between the main grilling enclosure and the main fire box, at 121 a wheel, and at 118 the base for the grill (main grilling enclosure and main fire box). At 1002 and 1004 are mounting points for an optional removable door for the grill area.

Figure 11:
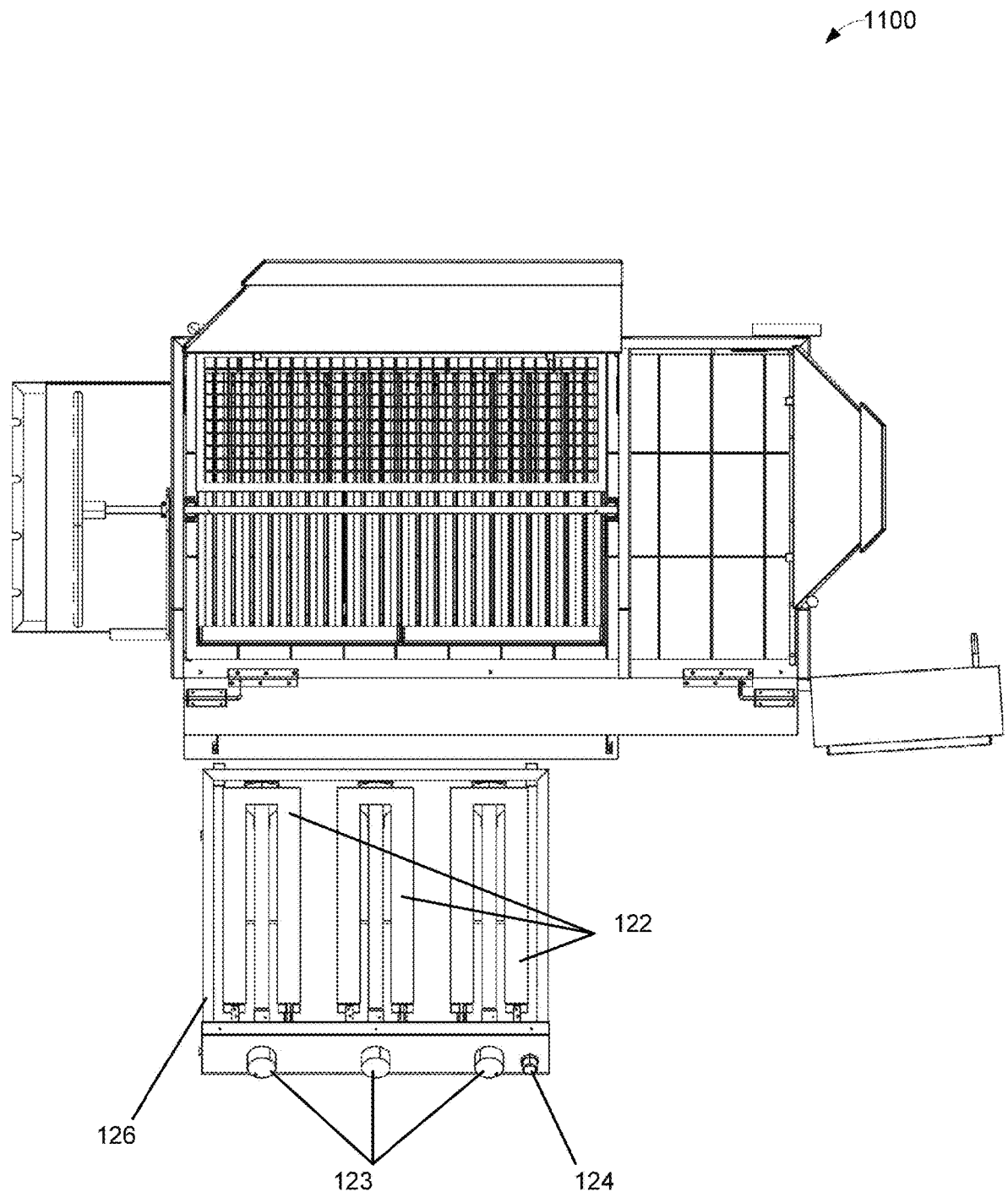
FIG. 11 illustrates, generally at 1100, a top view of one embodiment of the invention.

FIG. 11 illustrates, generally at 1100, a top view of one embodiment of the invention. At 126 is a metal box holding the gas burner assembly which has at least the burners 122 and the control valves 123 and the ignition 124.

Figure 12:
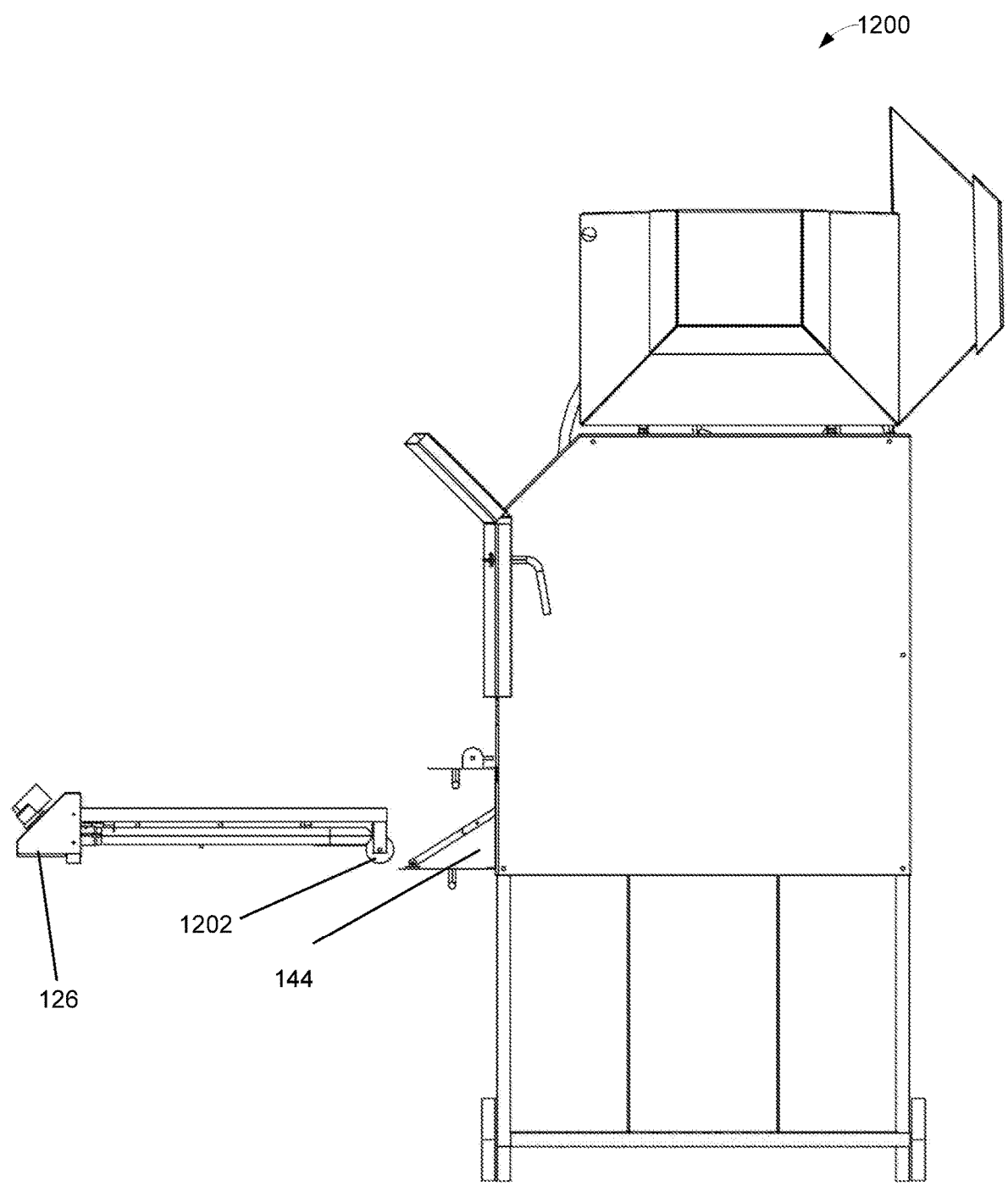
FIG. 12 illustrates, generally at 1200, a side view of one embodiment of the invention.

FIG. 12 illustrates, generally at 1200, a side view of one embodiment of the multi fuel grill structure. At 126 is the metal box for the gas burner assembly and at 144 is the opening of the base for storage of the gas burner assembly. At 1202 is a wheel.

Figure 13:
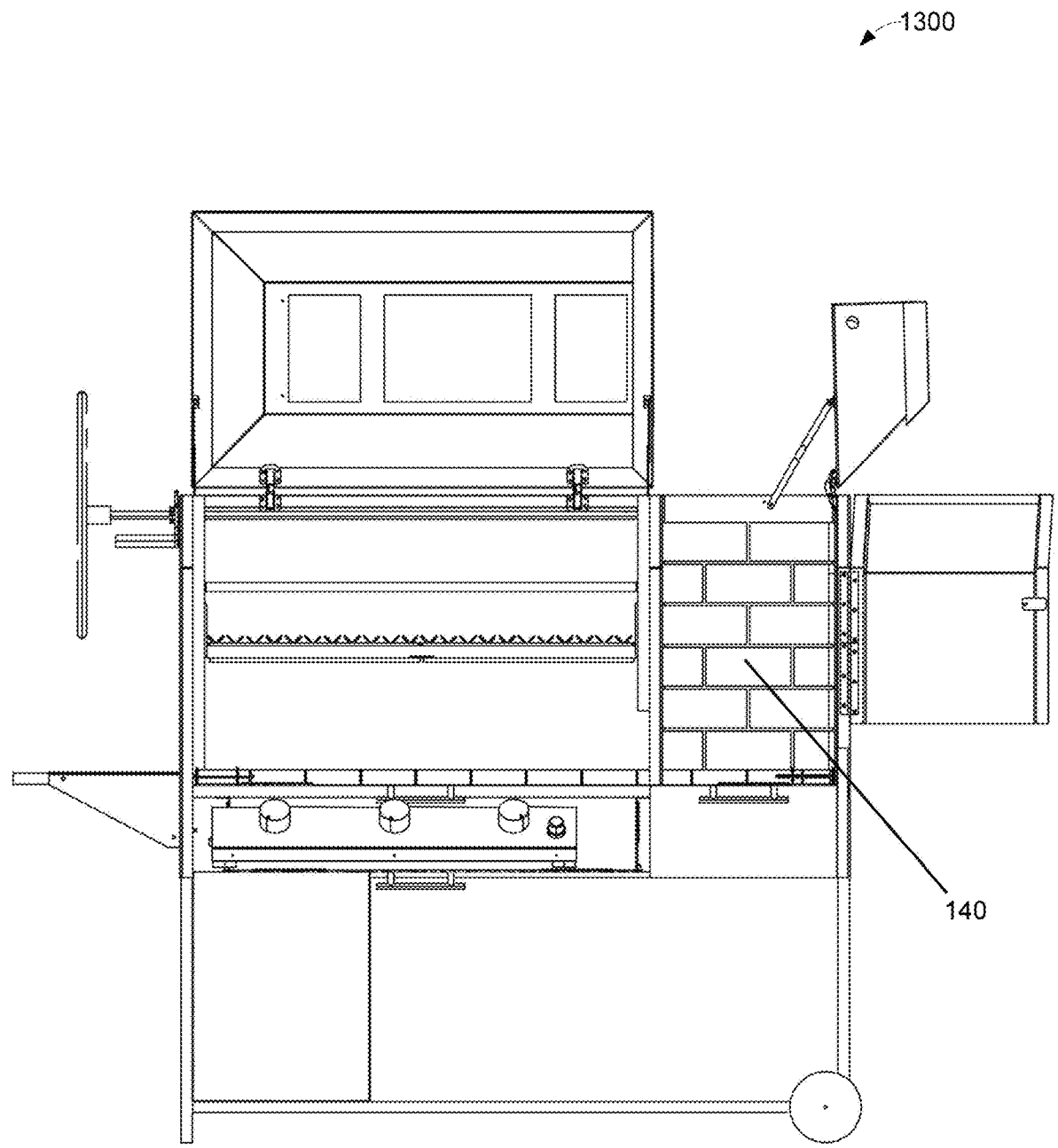
FIG. 13 illustrates, generally at 1300, a front view of one embodiment of the invention.

FIG. 13 illustrates, generally at 1300, a front view of one embodiment of the invention. At 140 is the back of the main fire box made of metal and here shown lined with bricks.

Figure 14:
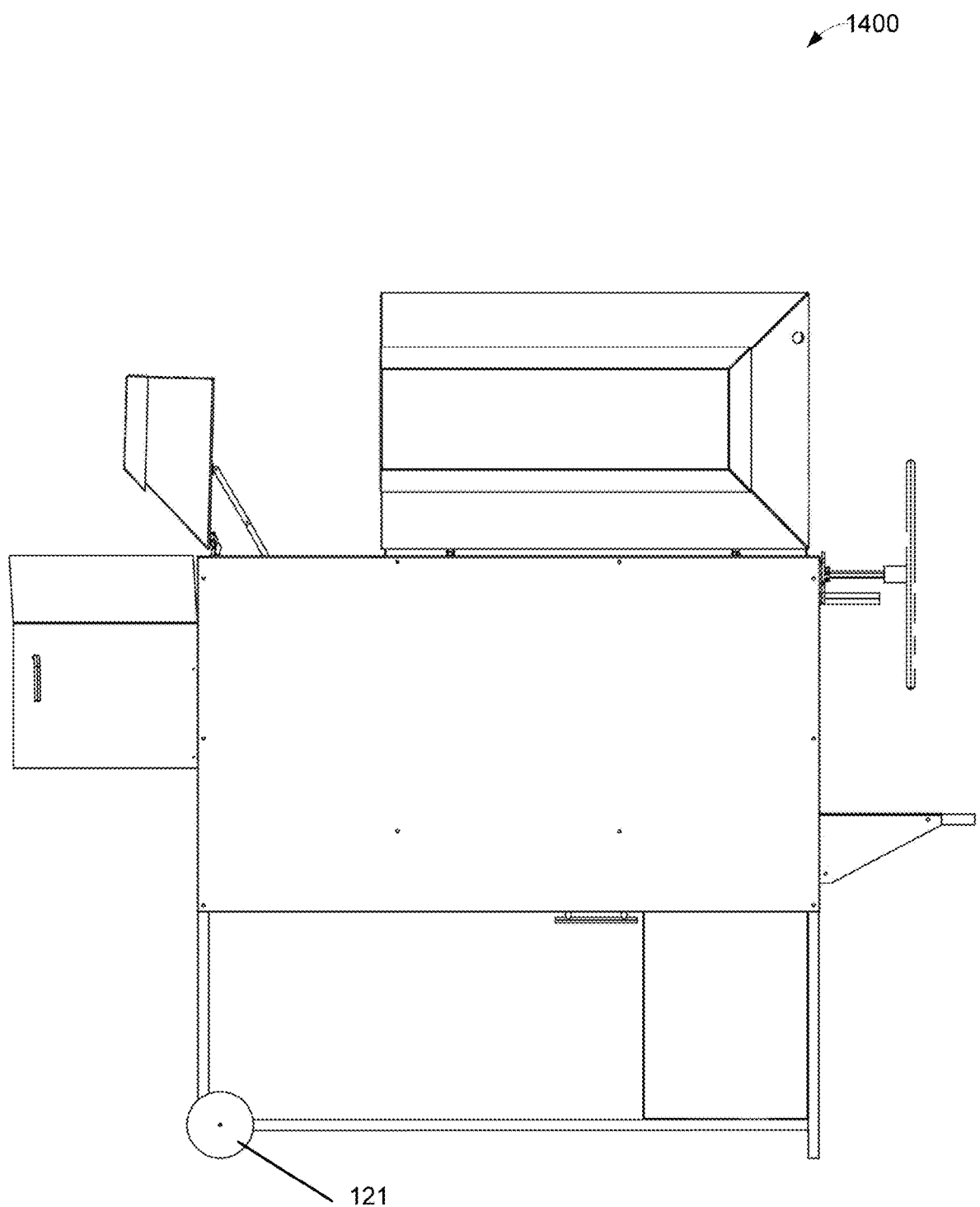
FIG. 14 illustrates, generally at 1400, a back view of one embodiment of the invention.

FIG. 14 illustrates, generally at 1400, a back view of one embodiment of the invention. At 121 is a wheel.

Figure 15:
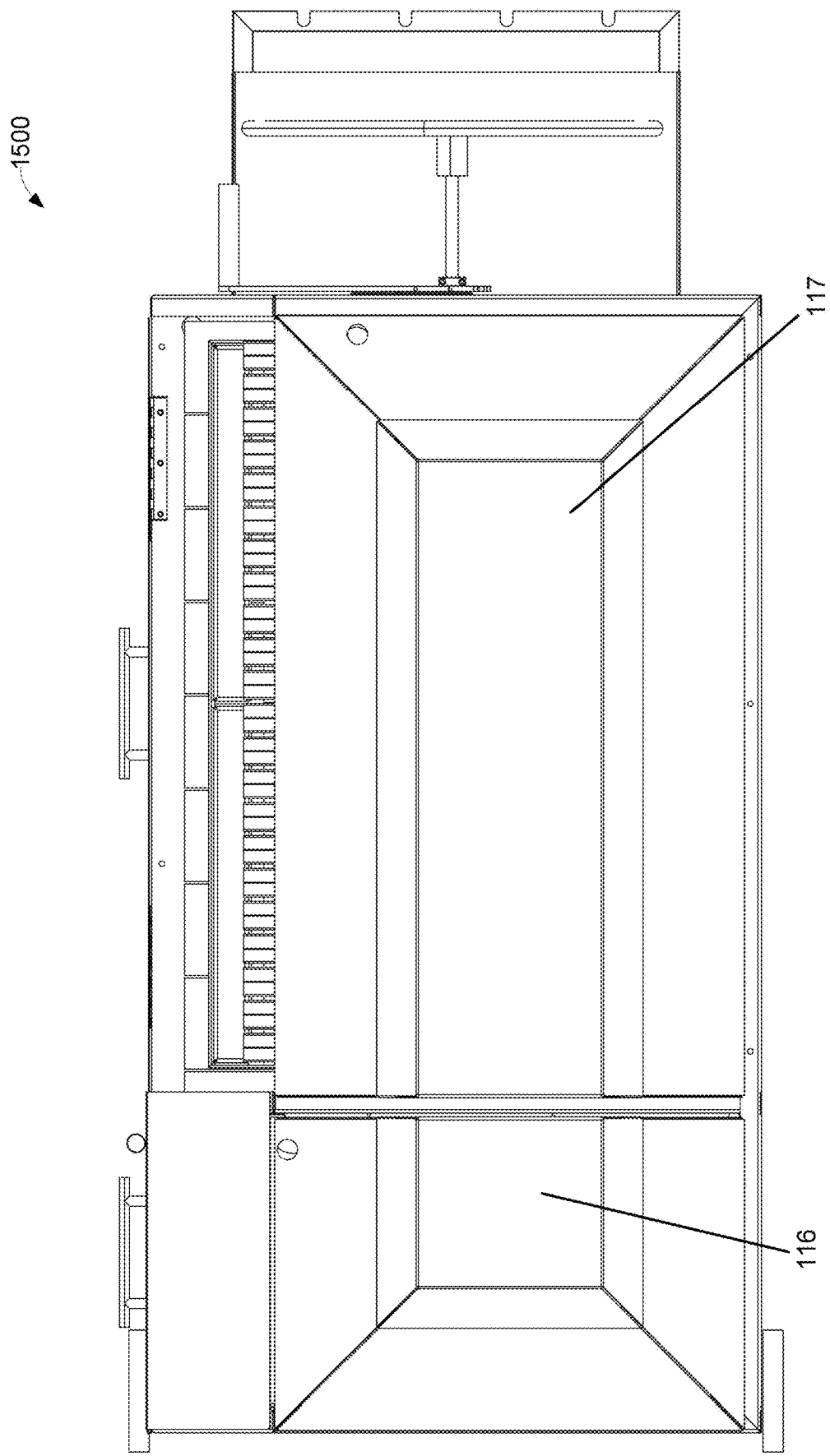
FIG. 15 illustrates, generally at 1500, a closed top view of one embodiment of the invention.

FIG. 15 illustrates, generally at 1500, a closed top view of one embodiment of the invention. At 117 is the main grilling enclosure top, and at 116 is the main fire box top, both shown in a closed position.

Figure 16:
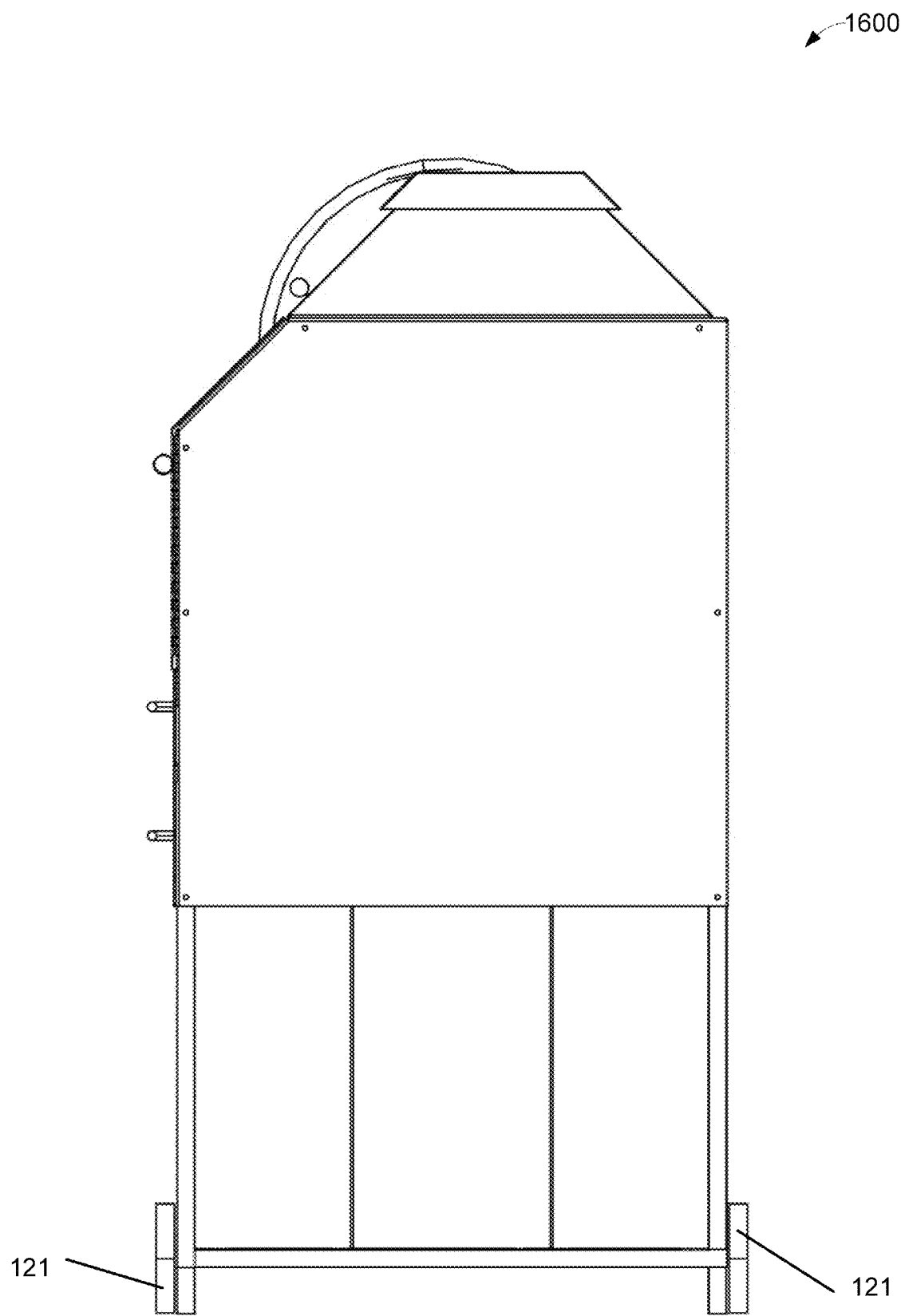
FIG. 16 illustrates, generally at 1600, a closed side view of one embodiment of the invention.

FIG. 16 illustrates, generally at 1600, a closed side view of one embodiment of the invention. At 121 are wheels.

Figure 17:
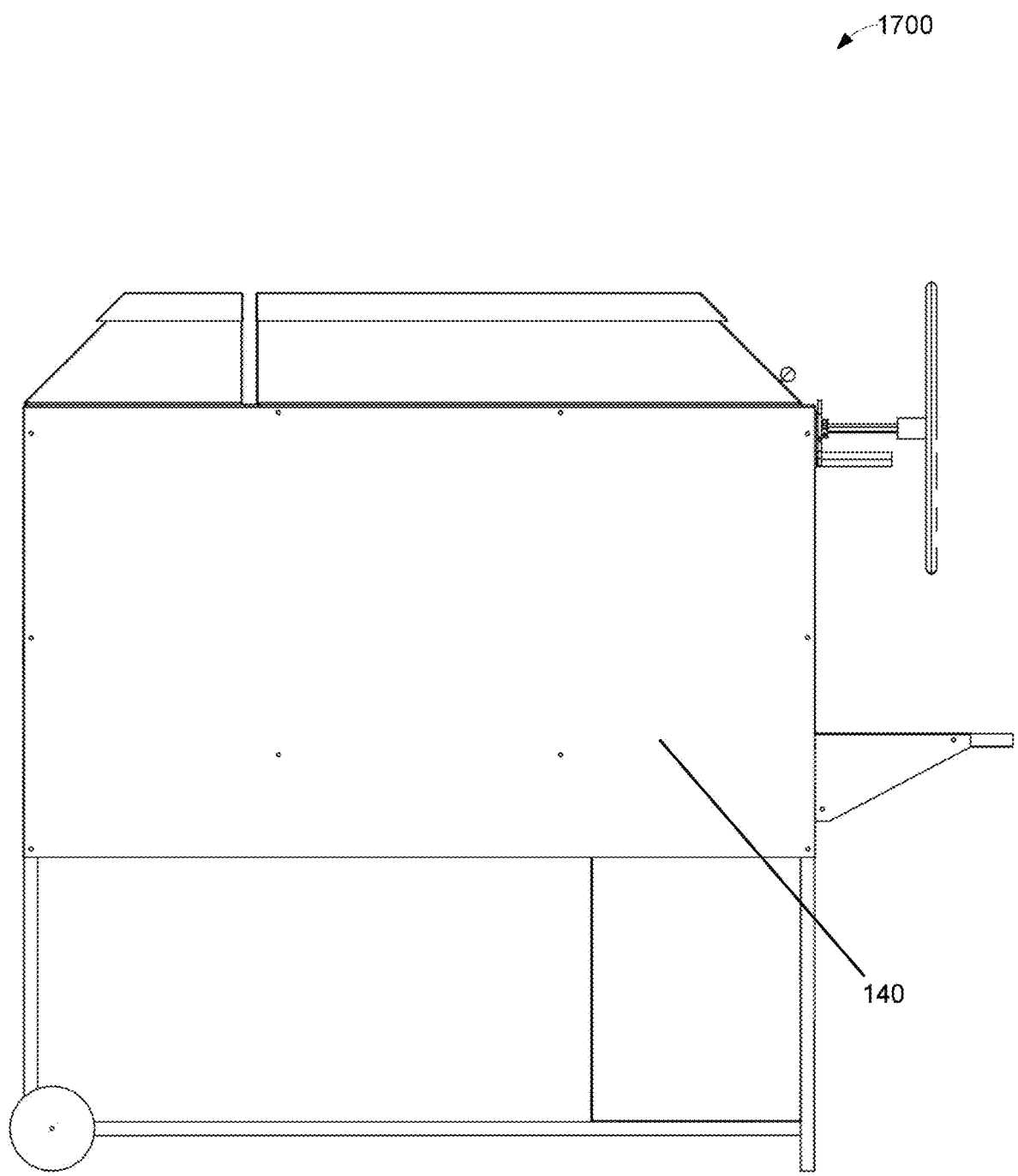
FIG. 17 illustrates, generally at 1700, a closed back view of one embodiment of the invention.

FIG. 17 illustrates, generally at 1700, a closed back view of one embodiment of the invention. At 140 is shown a back of the main grilling enclosure and main fire box that is constructed out of metal thick enough to withstand the heat from the grill and fire box.

Figure 18:
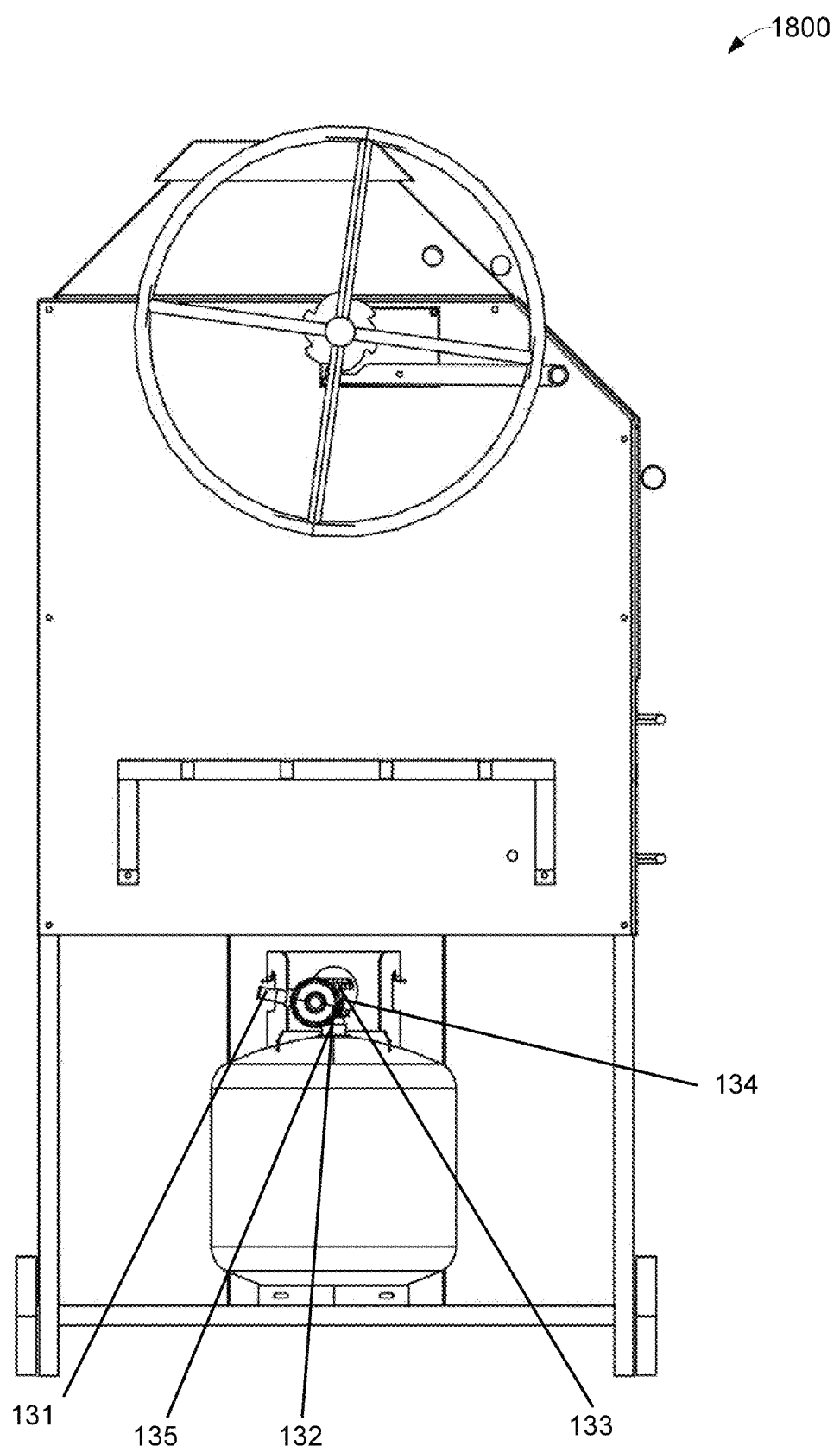
FIG. 18 illustrates, generally at 1800, a closed side view of one embodiment of the invention.

FIG. 18 illustrates, generally at 1800, a closed side view of one embodiment of the invention. At 131 is the hose connection to the gas, at 135 the connection to the gas tank, at 132 the gas supply hose, at 133 the regulator connection to the regulator, and at 134 the connection nut to the fitting.

Figure 19:
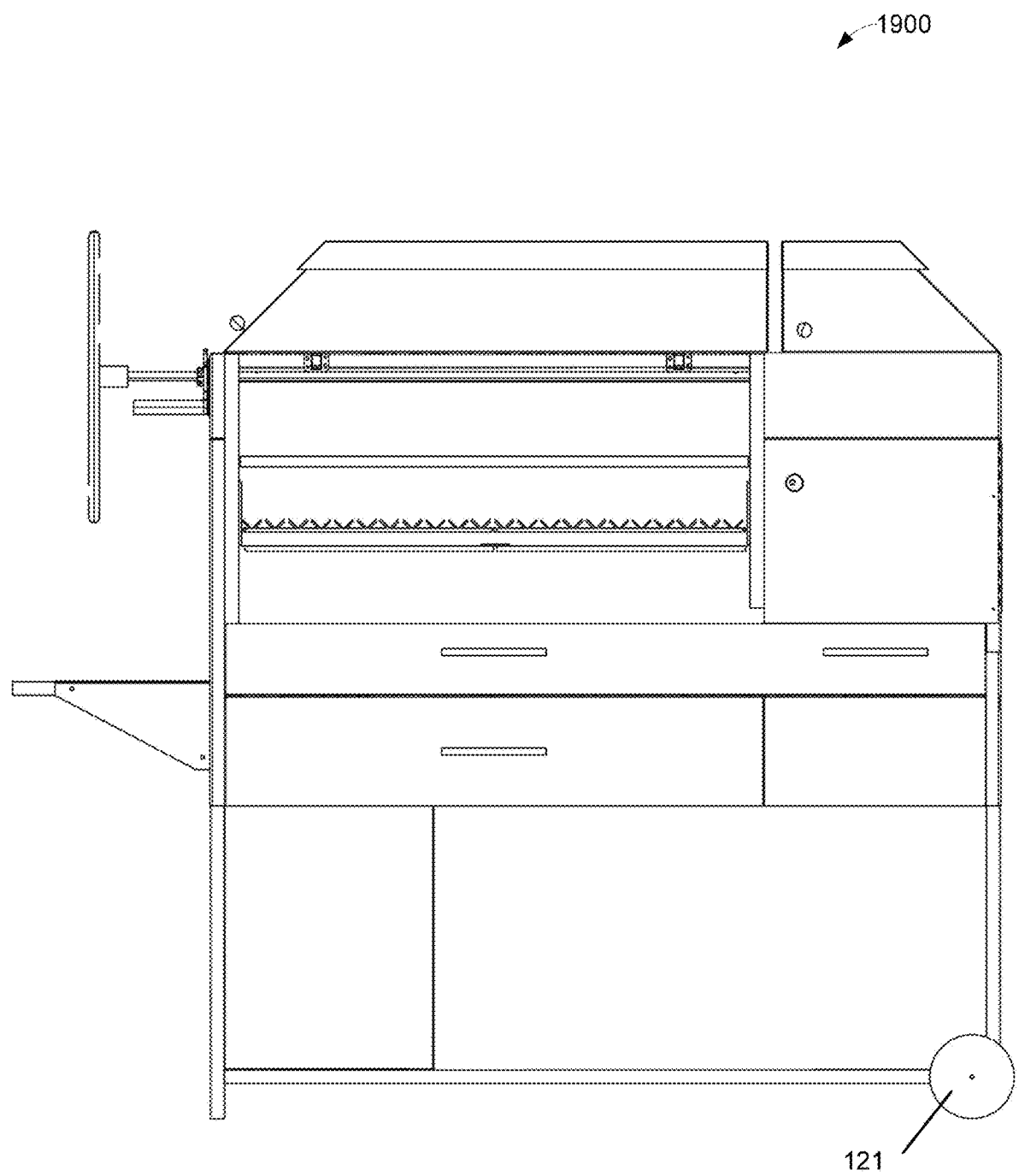
FIG. 19 illustrates, generally at 1900, a closed front view of one embodiment of the invention.

FIG. 19 illustrates, generally at 1900, a closed front view of one embodiment of the invention. At 121 is shown a wheel.

Figure 20:
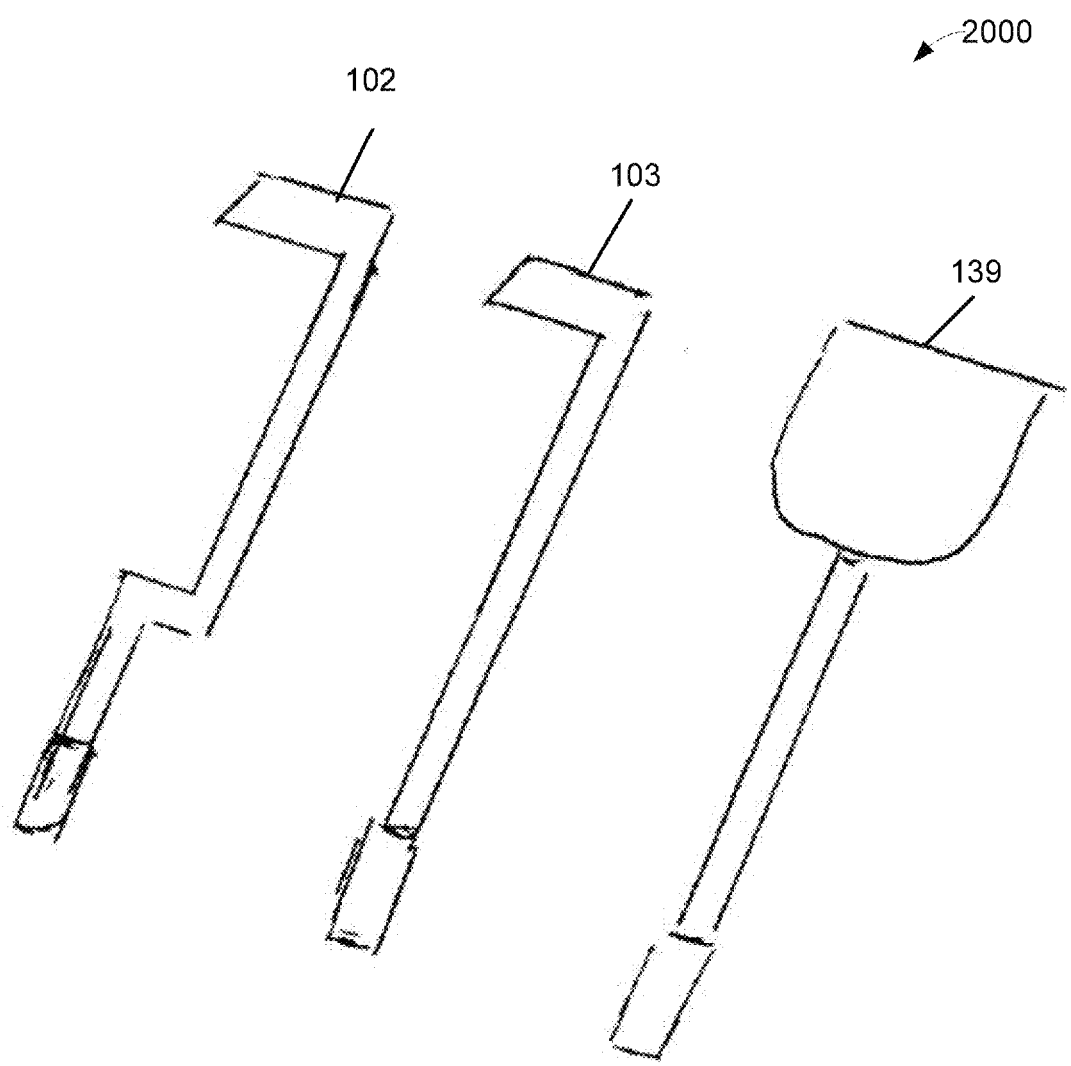
FIG. 20 illustrates, generally at 2000, view of one embodiment of the invention.

FIG. 20 illustrates, generally at 2000, view of one embodiment of the invention. At 102 is a first pasador (tool) for transferring charcoal from the main fire box through the opening onto the main grilling area, at 103 is a second tool (pasador) for transferring charcoal from the main fire box through the opening onto the main grilling area, at is a shovel fro use in cleaning the fire box of charcoal and/or ashes (ash shovel), and at 137 is a flat fan with two handles for fanning a charcoal fire.

Figure 21:
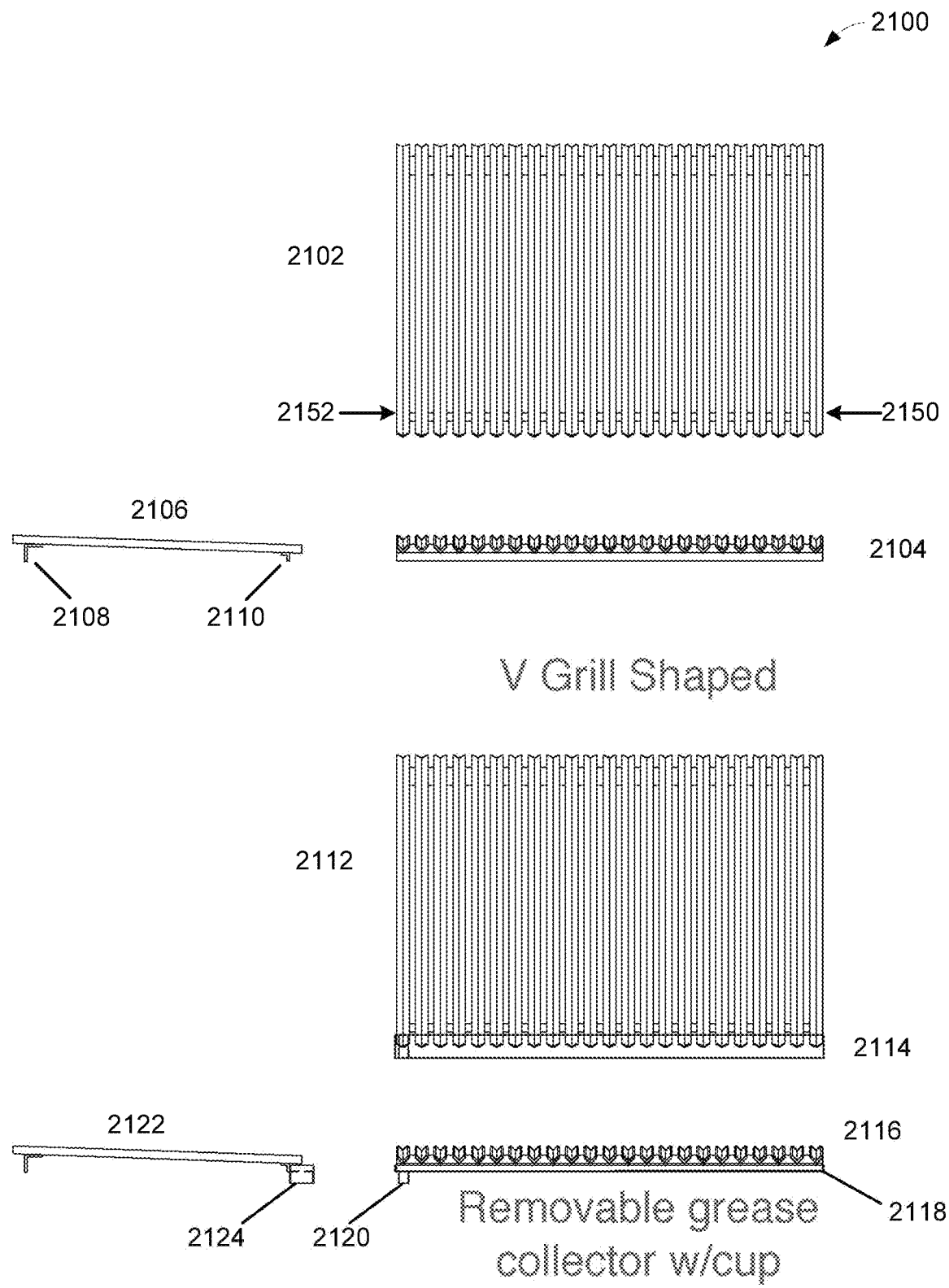
FIG. 21 illustrates, generally at 2100, various embodiments of the invention showing a V-shaped grill.

FIG. 21 illustrates, generally at 2100, various embodiments of the invention. At 2102 is shown a top view of a V-shaped grill (similar to FIG. 6 at 101). At 2104 is shown a front view of a V-shaped grill. At 2106 is shown a side view of a V-shaped grill. At 2108 is a back leg or support for the V-shaped grill which is longer in length than the smaller in length front leg or support 2110 for the V-shaped grill. With legs 2108 and 2110 of different lengths, V-shaped grill 2016 is angled downward (inclined) and grilling contents such as grease can flow in a direction toward the front of the V-shaped grill. At 2112 is shown a top view of a V-shaped grill, having a grease collector 2114 (similar to FIG. 6 at 114). At 2116 is shown a front view of a V-shaped grill having a grease collector 2118. At 2120 is shown a cup for collecting the grease (similar to FIG. 6 at 115). At 2122 is shown a side view of a V-shaped grill which has different sized legs as 2016 does (2108 and 2110), however they are not labeled. At 2124 is a side view of a grease collector cup. The V-shaped grill while illustrated as tilting from back to front to allow grease to flow can also be tilted from a front view perspective to the left or right from horizontal to allow the grease collector to be tilted. That is, for example, edge 2150 of the V-shaped grill may be higher than edge 2152 of the V-shaped grill. Additionally, the grease collector is removable for cleaning. The grease drip pan (cup) is also removable for cleaning.

Figure 22:
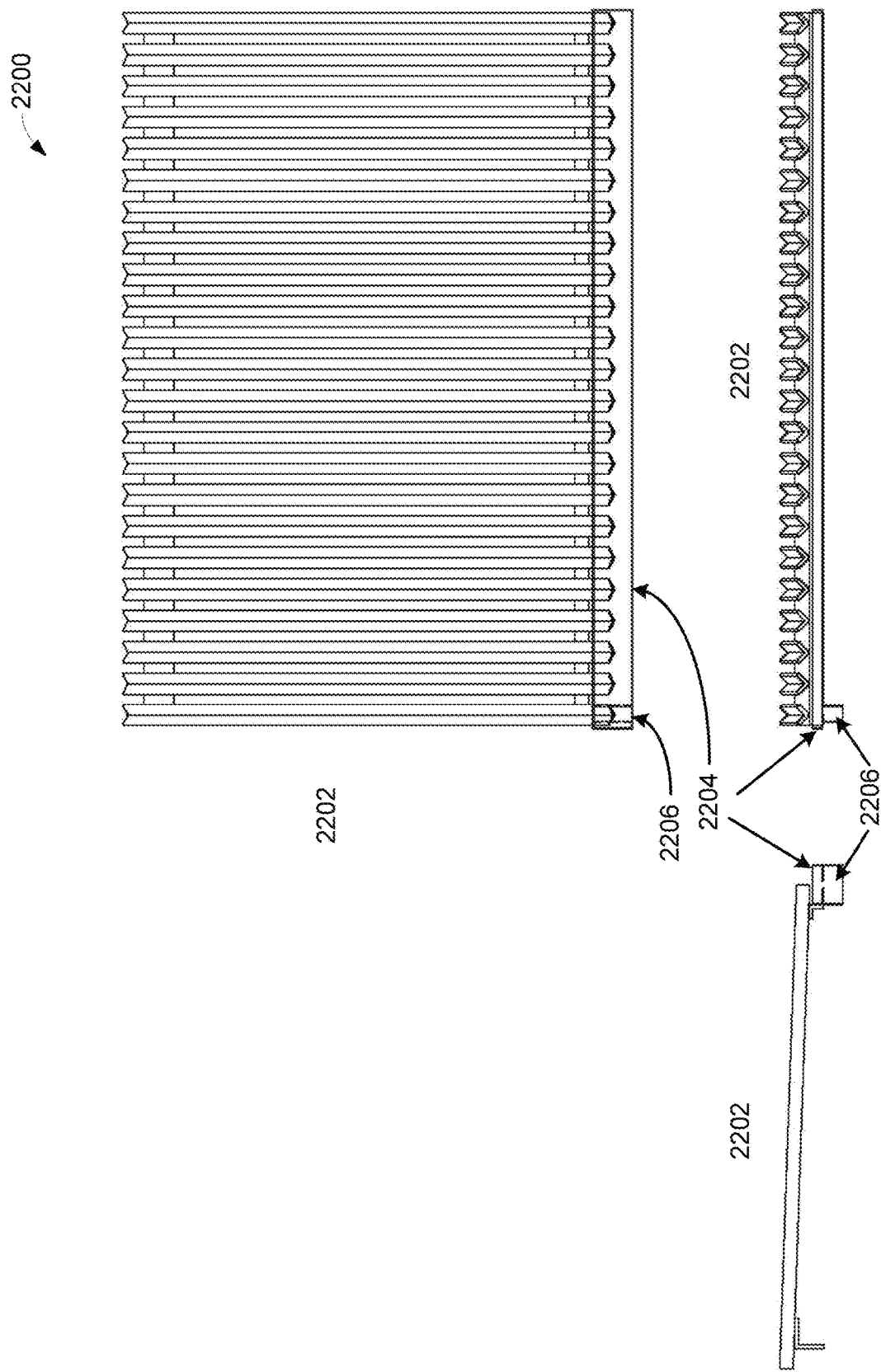
FIG. 22 illustrates, generally at 2200, various embodiments of the invention showing a V-shaped grill.

FIG. 22 illustrates, generally at 2200, various embodiments of the invention. At 2202 are shown a top, side, and front view of a V-shaped grill. At 2204 are shown a top, side, and front view of a grease collector. At 2206 are shown a top, side, and front view of a grease collection cup. The V-shaped grill 2202, the grease collector 2204, and grease cup (collection cup) 2206 are all removable for cleaning. Additionally, the V-shaped grill may be tilted back to front and side to side to assist the grease flowing into the collection cup.

Figure 23:
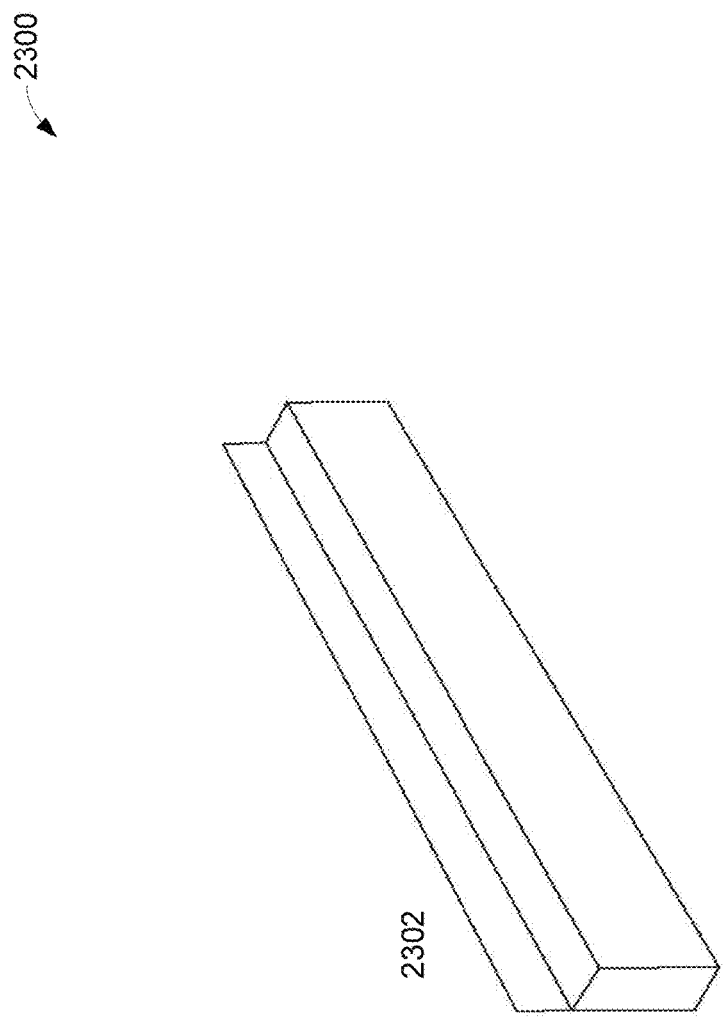
FIG. 23 illustrates, generally at 2300, an insulating piece of one embodiment of the invention.

FIG. 23 illustrates, generally at 1700, an insulating piece of one embodiment of the invention. At 2302 is a closeable, removable, and insulated piece that can be used in the transfer area. For example, 2302 may be placed in the transfer area, for example FIG. 6 to close the opening 104. In this way the charcoal may be closed off from the cooking area. For example, 2302 may be placed in the transfer area, for example FIG. 10 to close the opening 104. In this way the charcoal section may be closed off from the cooking area.

Figure 24:
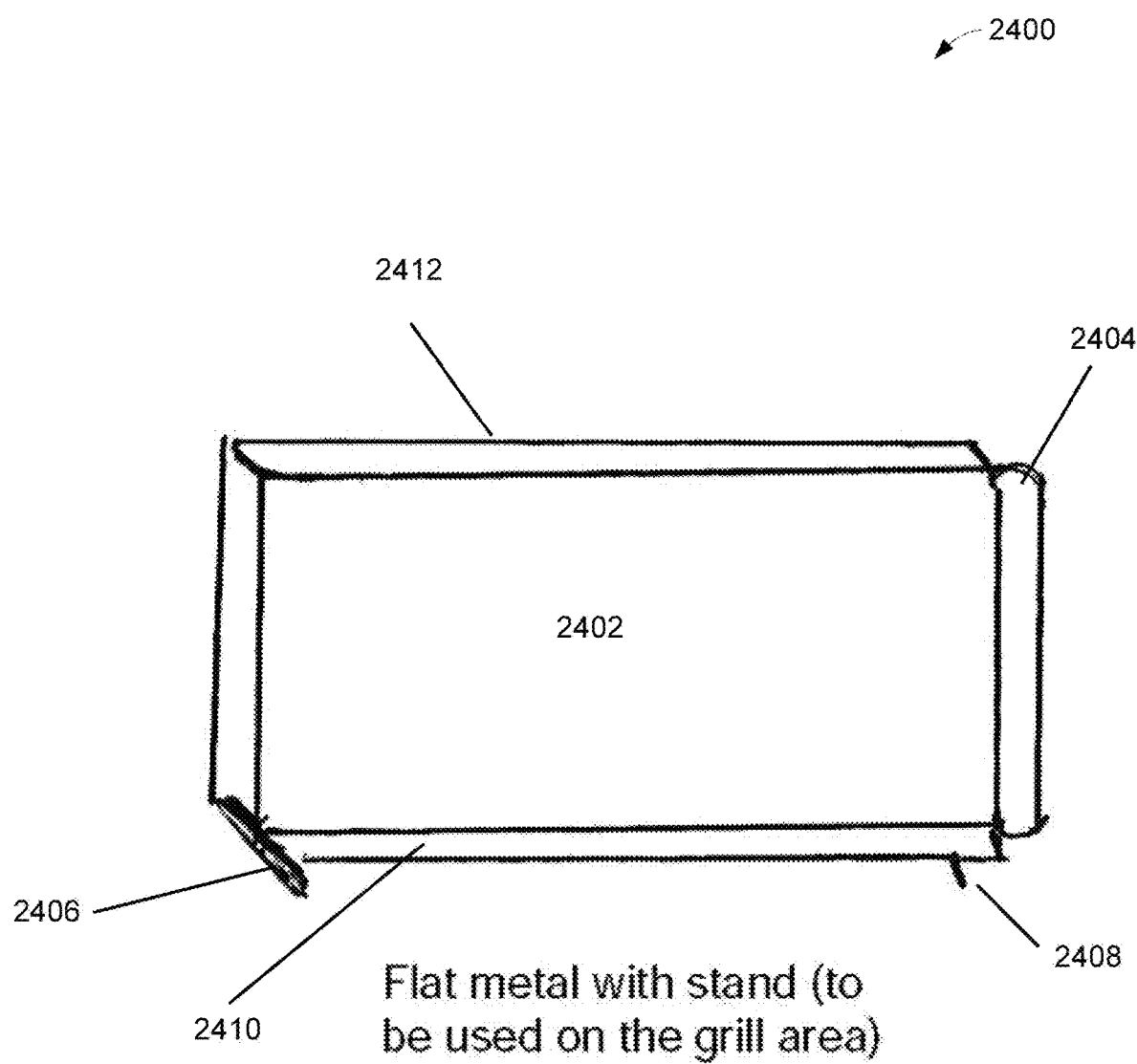
FIG. 24 illustrates, generally at 2400, a blocking device of one embodiment of the invention.

FIG. 24 illustrates, generally at 2400, a blocking device of one embodiment of the invention. The device 2402 has front handle 2404, a backside 2412, legs 2406 and 2408, and a lip 2410. Device 2402 is used to prevent heat loss when using the gas grill by sitting on the grilling area (example FIG. 10 at 105) with the backside 2412 blocking the transfer area (example FIG. 10 at 104).

Figure 25:
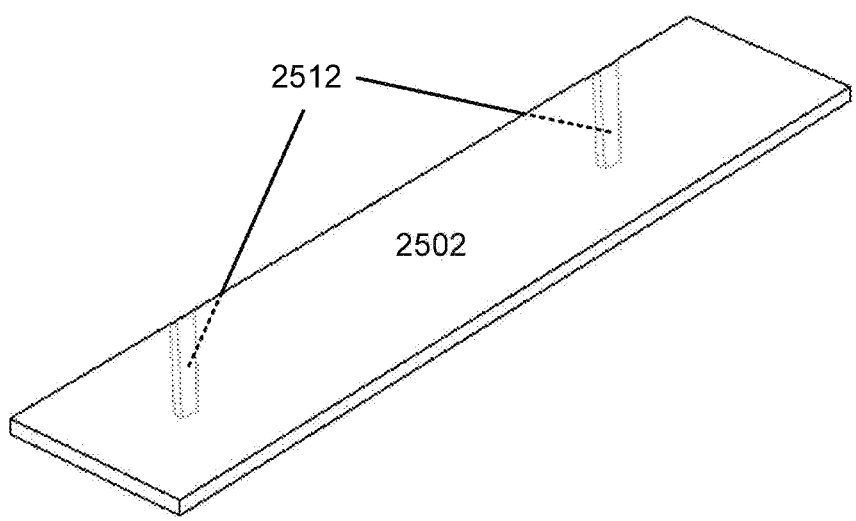
FIG. 25 illustrates, generally at 2500, a removable board of one embodiment of the invention.

FIG. 25 illustrates, generally at 2500, a removable board of one embodiment of the invention. At 2502 is a surface, such as, but not limited to, a cutting board, a shelf, etc. which has projections 2512 which are attached to 2502. The projections 2512 may be inserted into holes or slots to position the removable board 2502. For example, into holes 910 in FIG. 9.

Figure 26:
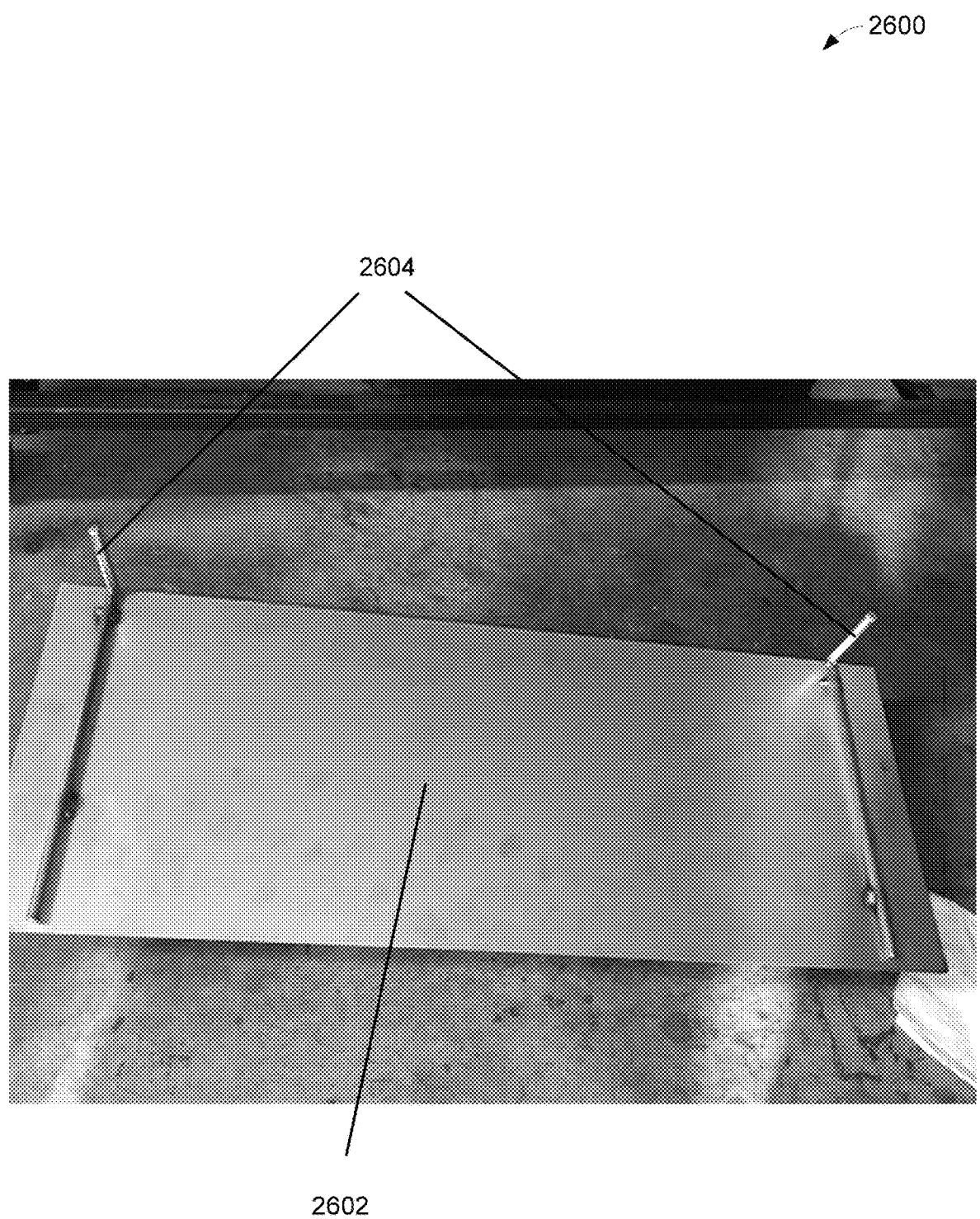
FIG. 26 illustrates, generally at 2600, a placeable surface of one embodiment of the invention.

FIG. 26 illustrates, generally at 2600, a placeable surface of one embodiment of the invention. At 2602 is the main surface, such as, but not limited to, a cutting board, a shelf, etc. which has projections 2604 which are attached to 2602. The projections 2604 may be inserted into holes or slots to position the main surface 2602. For example, into holes 910 in FIG. 9.

Figure 27:
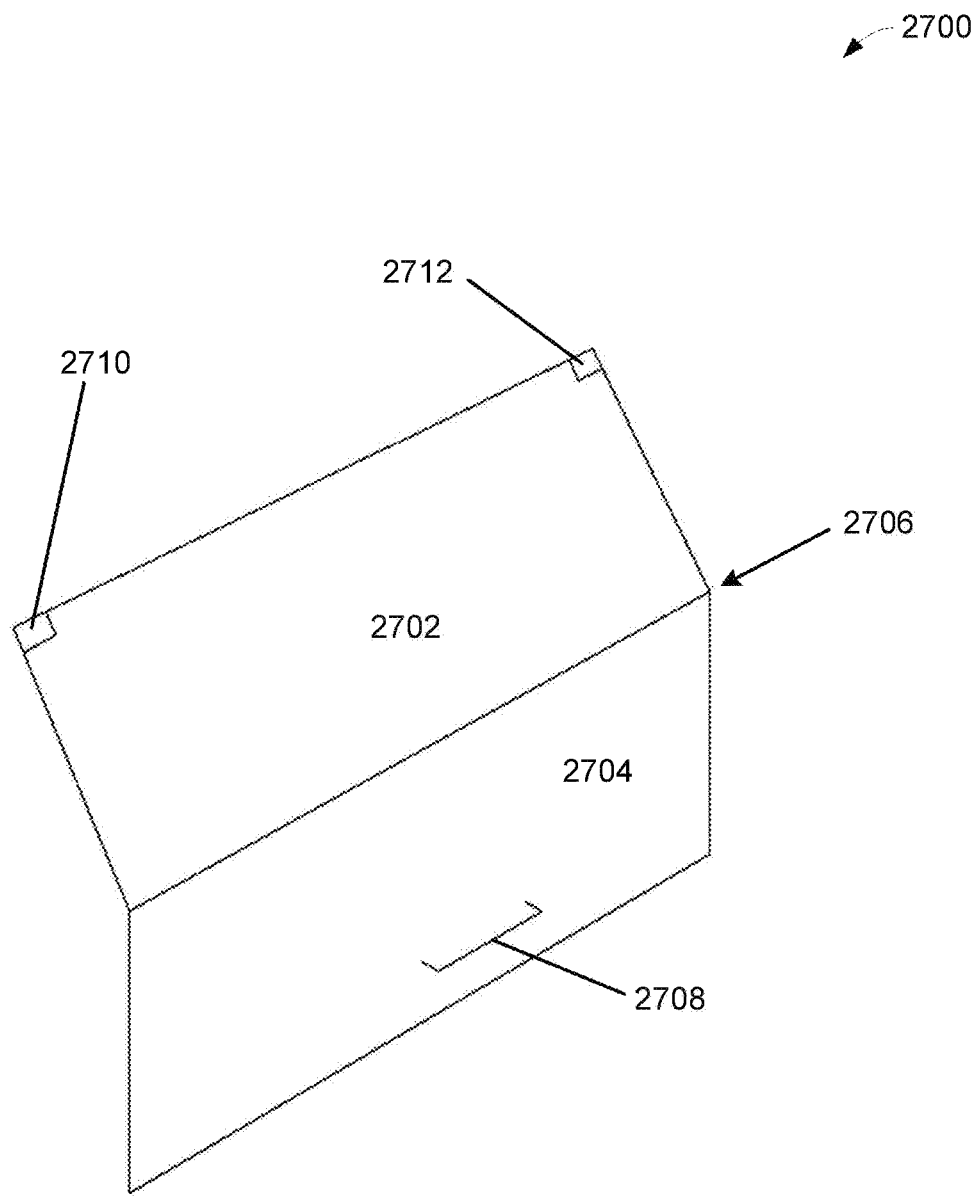
FIG. 27 illustrates, generally at 2700, a front door for a grill area of one embodiment of the invention.

FIG. 27 illustrates, generally at 2700, a front door for a grill area of one embodiment of the invention. At 2702 is a first section of a front door and at 2704 is a second section of a front door. 2702 and 2704 may be fixedly attached, or one piece, or may be hinged together at a point indicated by 2706. 2708 is an handle fixedly attached to section 2704. At 2170 and 2712 are hinge points that can either be fixedly attached or 2710 and 2712 may be hinges that are removably attached. Fixedly attached will not allow 2702 and 2704 to be removed. Removably attached will allow sections 2702 and 2704 to be removed, for example for easier cleaning and then placed back on the grill. For example, 2170 and 2712 may be attached fixedly or removably to points 1002 and 1004 in FIG. 10.

Figure 28:
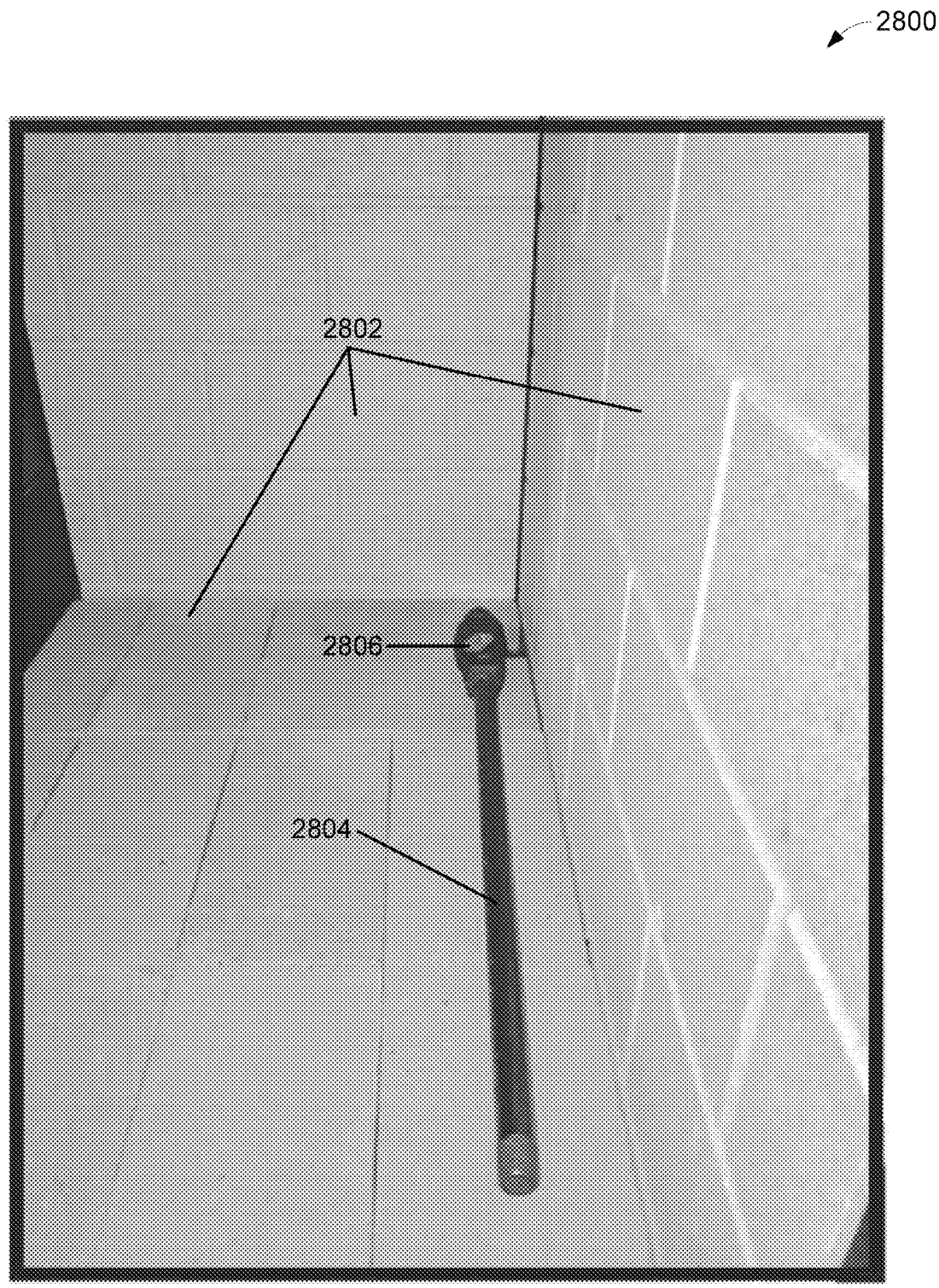
FIG. 28 illustrates, generally at 2800, one embodiment of the invention showing a log or charcoal lighter with a mixing chamber.

FIG. 28 illustrates, generally at 2800, one embodiment of the invention showing a log or wood or charcoal lighter with a mixing chamber (gas lighter pipe with a mixing chamber). At 2802 are shown the bottom surface, the back surface, and the right side surface of a firebox. At 2804 is shown a log or wood or charcoal lighter 2804. The log, wood, or charcoal lighter 2804 has a mixing chamber 2806. While the log, wood, or charcoal lighter 2804 is shown here on the bottom of the firebox, the invention is not so limited, and for example, the log, wood, or charcoal lighter 2804 may be mounted above the bottom surface of the firebox, on a side of the firebox, etc. The log, wood, or charcoal lighter 2804 may be fed fuel through a line in the firebox and can ignite the fuel, be it logs, wood, or charcoal.

Figure 29:
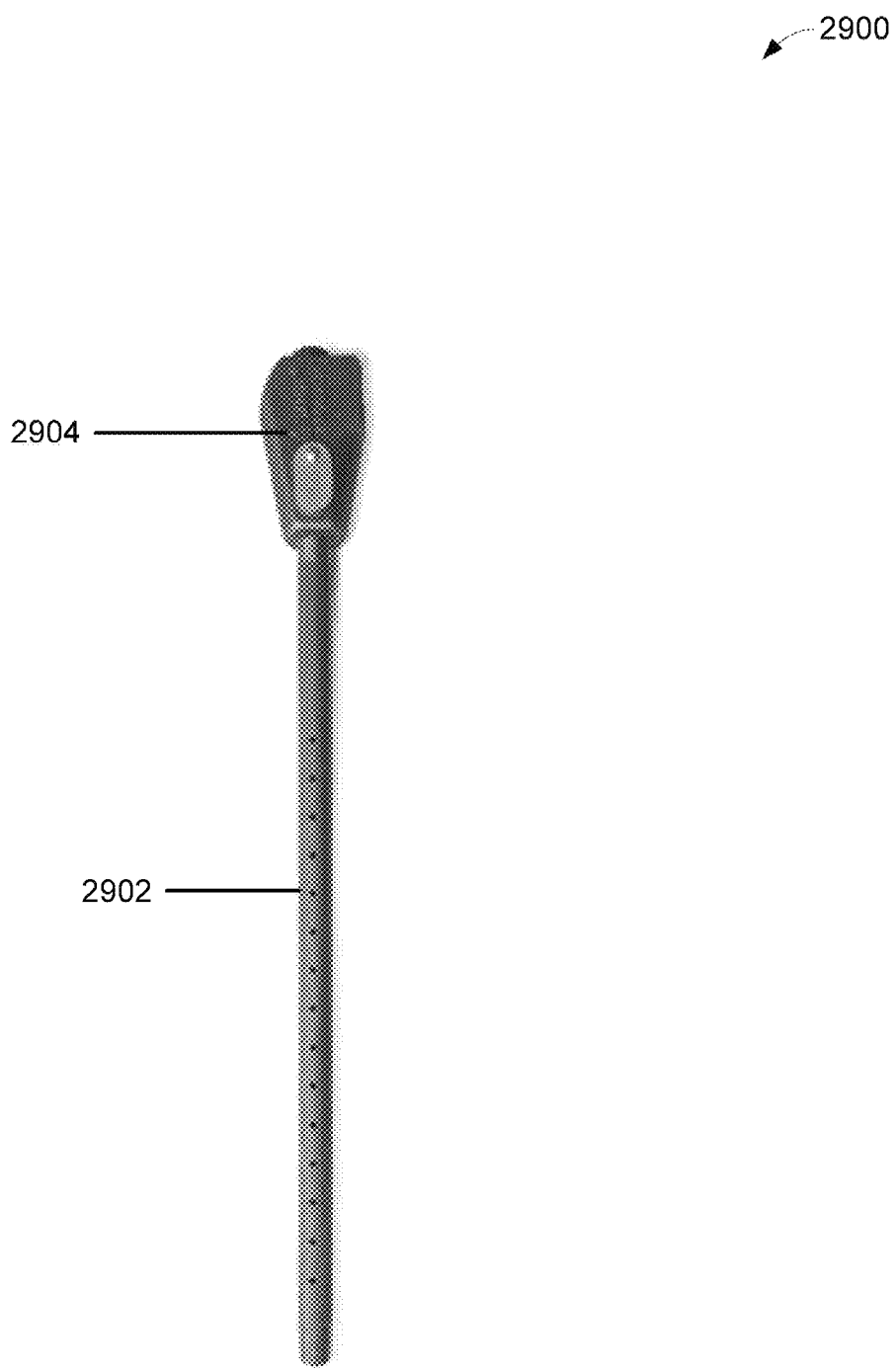
FIG. 29 illustrates, generally at 2900, one embodiment of the invention showing a log or charcoal lighter with a mixing chamber.

FIG. 29 illustrates, generally at 2900, one embodiment of the invention showing a log or charcoal lighter with a mixing chamber. At 2902 is shown a log or charcoal lighter having a mixing chamber 2904.

Figure 30:
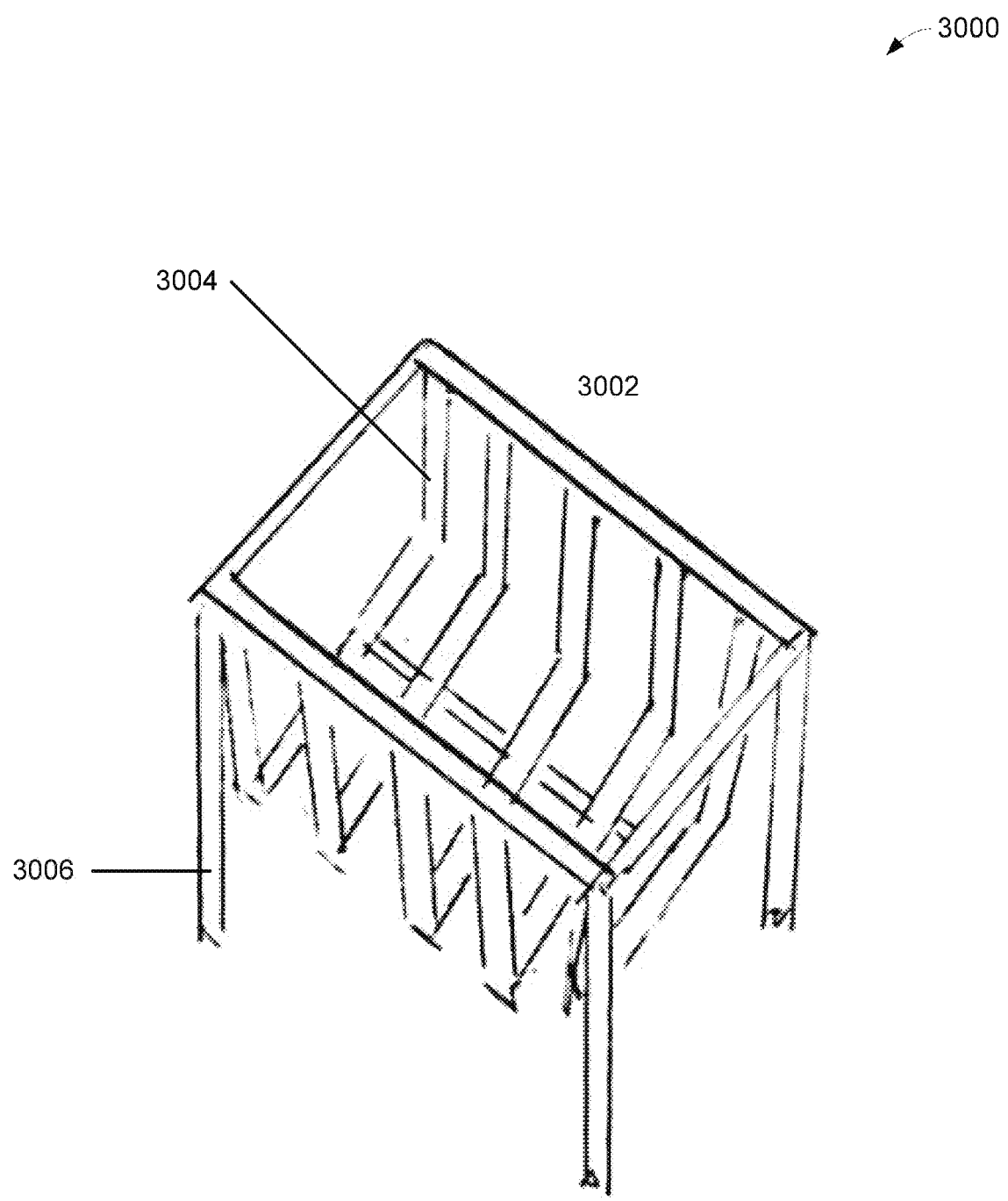
FIG. 30 illustrates, generally at 3000, one embodiment of the invention showing a log or charcoal holder for a firebox.

FIG. 30 illustrates, generally at 3000, one embodiment of the invention showing a log or charcoal holder for a firebox.

At 3002 is the log or charcoal holder having U-shaped member (3004 representative) and legs (3006 representative). 3002 sits in the firebox and can hold fuel, such as, but not limited to logs, wood, and charcoal. Member 3004 may be rectangular in shape or any shape capable of holding logs, wood, or charcoal.

Figure 31:
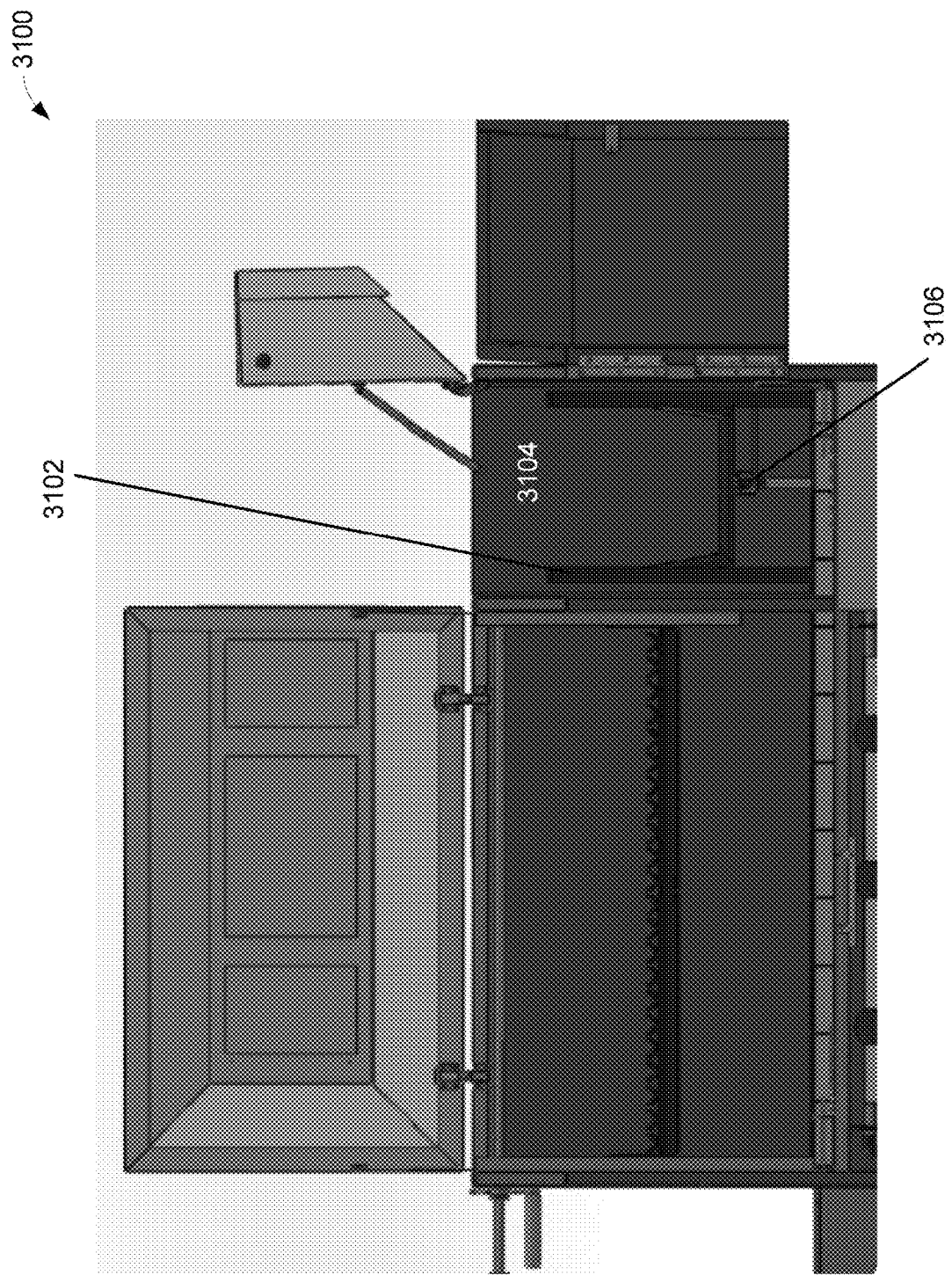
FIG. 31 illustrates, generally at 3100, one embodiment of the invention showing a log or charcoal holder for a firebox.

FIG. 31 illustrates, generally at 3100, one embodiment of the invention showing a log or charcoal holder for a firebox. At 3104 is the firebox. At 3102 is the log or charcoal holder. At 3106 is shown a log or charcoal lighter.

Figure 32:
FIG. 32 illustrates, generally at 3200, one embodiment of the invention showing a perspective view of a log or charcoal holder for a firebox.

FIG. 32 illustrates, generally at 3200, one embodiment of the invention showing a perspective view of a log or charcoal holder for a firebox. At 3202 is shown the log or charcoal holder.

Figure 33:
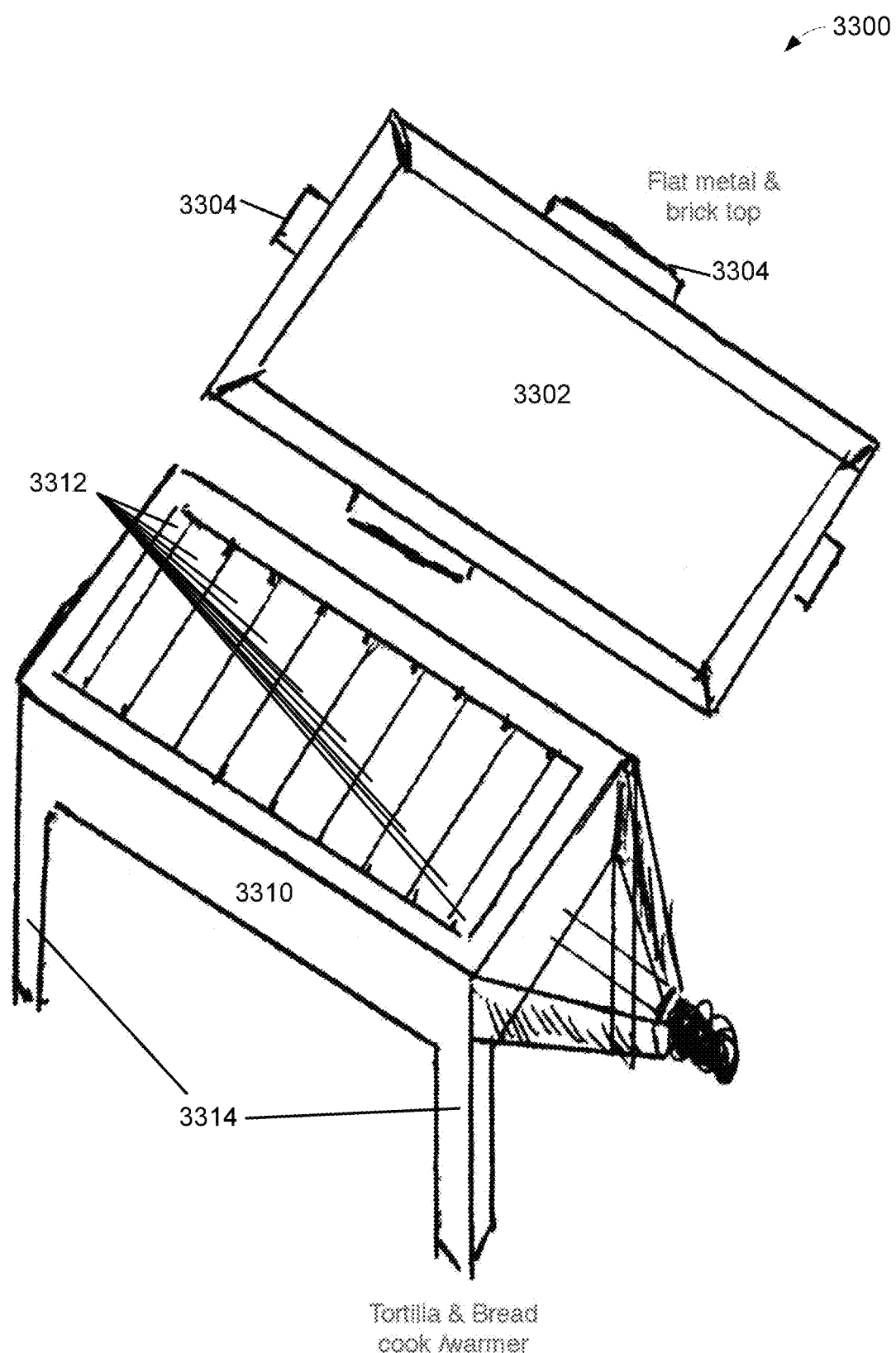
FIG. 33 illustrates, generally at 3300, one embodiment of the invention showing a warmer and/or cooker for the firebox.

FIG. 33 illustrates, generally at 3300, one embodiment of the invention showing a warmer and/or cooker for the firebox. Assembly 3302 sits on top of assembly 3310. Assembly 3302 has handles 3304 representative. 3302 may be made of a variety of materials, for example, but not limited to metal, brick, or combination of the two, etc. Likewise assembly 3310 may be made of a variety of materials, for example, but not limited to metal, brick, or combination of the two, etc. For example 3310 may be made of steel with bricks at 3312. Legs 3314 representative allow the entire assembly to sit in a firebox. The assembly can also sit in the firebox which has a log or charcoal holder with or without a log or charcoal lighter with a mixing chamber. The assembly 3302 and 3310 are removeable from the firebox.

Figure 34:
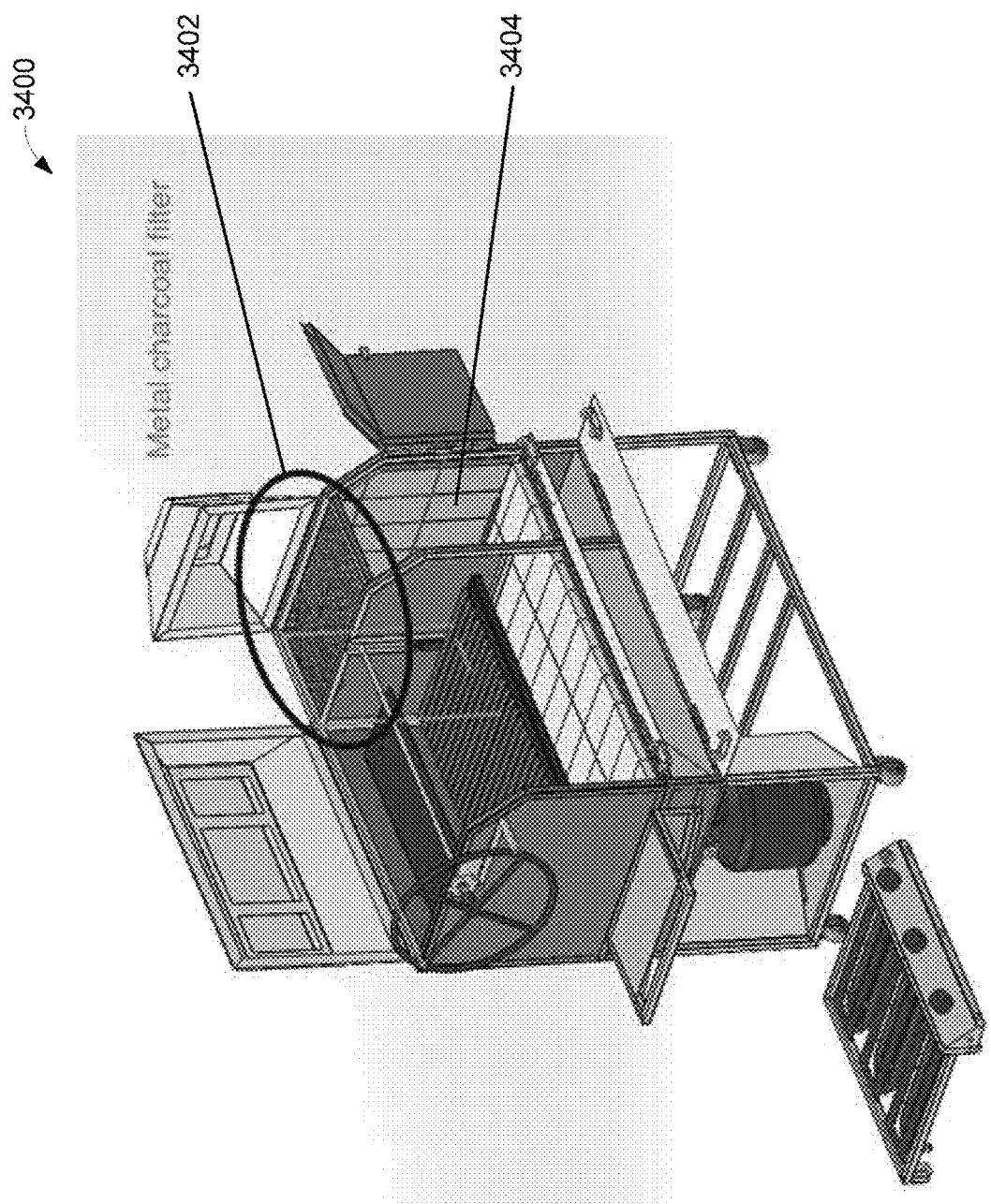
FIG. 34 illustrates, generally at 3400, various embodiments of the invention showing a metal filter.

FIG. 34 illustrates, generally at 3400, various embodiments of the invention showing a metal filter. At 3402 in the oval is shown a metal filter. This filter 3402 sits atop the firebox (firebox enclosure generally shown at 3404) and prevents embers from burning logs or charcoal from escaping.

Figure 35:
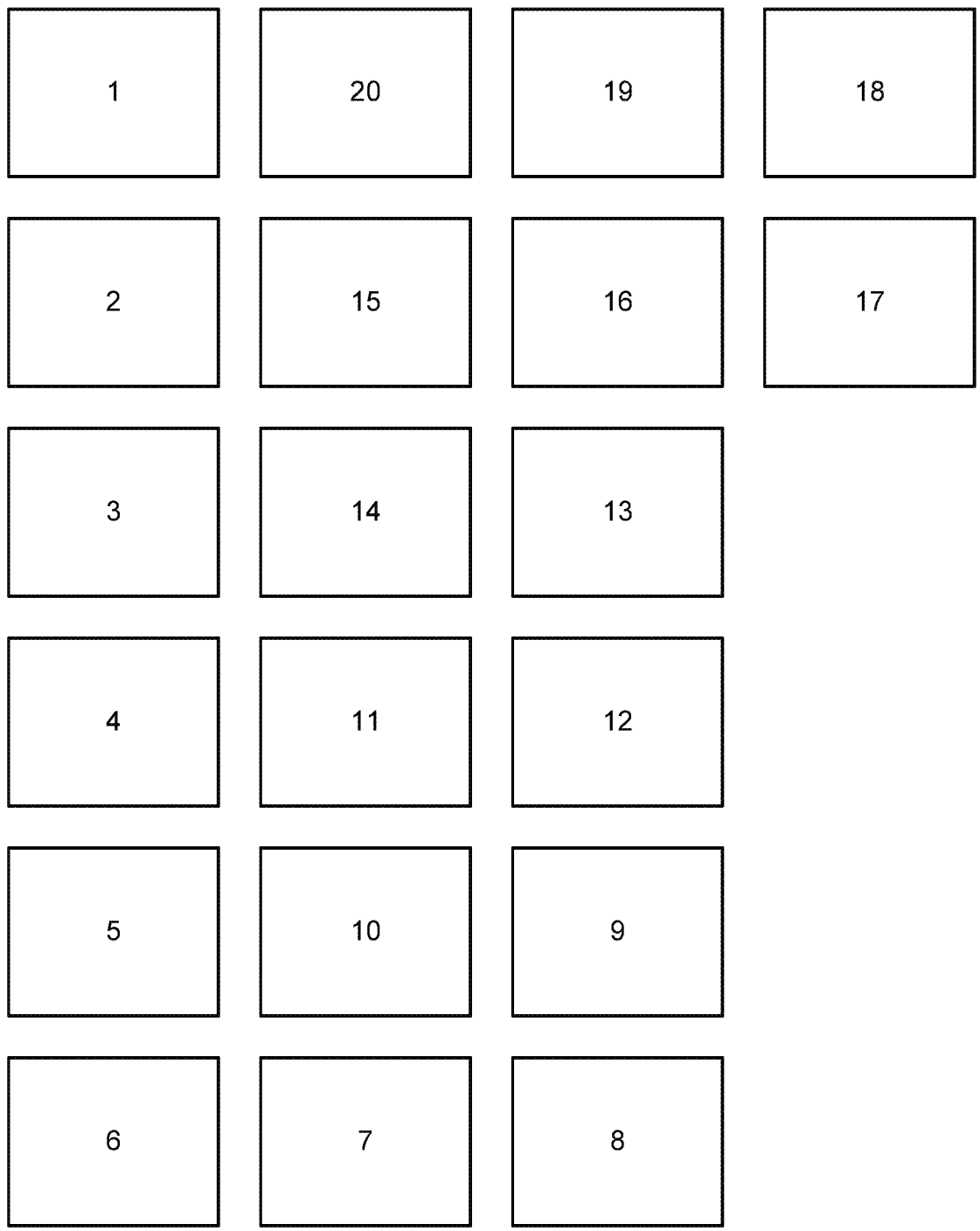
FIG. 35 illustrates, generally at 3500, various embodiments of the invention.

FIG. 35 illustrates, generally at 3500, various embodiments of the invention.

At item 1 a grill apparatus comprising: a fire box for holding charcoal, the fire box having a front side, a first side, a second side, a back side, a bottom, and a top; a transfer area fixedly attached to the fire box and located in proximity to the fire box first side and the fire box bottom; and the fire box having an opening in proximity to the fire box first side and the fire box bottom.

At item 2 the apparatus of item 1 wherein the fire box front side comprises a first door and a second door, the first door larger in size than the second door, and the first door located vertically above the second door.

At item 3 the apparatus of item 1 wherein the transfer area is in proximity to the second door.

At item 4 the apparatus of item 1 wherein the opening is of sufficient width and height to allow charcoal in the fire box to be transferred to the transfer area using a tool.

At item 5 the apparatus of item 4 wherein the tool comprises a handle at a first end and a hook at a distant end.

At item 6 the apparatus of item 1 further comprising a gas tank, a gas burner assembly, and a hose for connecting the gas tank to the gas burner assembly.

At item 7 the apparatus of item 6 wherein the gas burner assembly can be located proximate to the transfer area when gas is in use and located proximate to a metal base when charcoal is in use.

At item 8 the apparatus of item 6 wherein the gas burner assembly comprises a valve connect to the gas tank, an ignition, one or more burners, a metal box for the one or more burners, a tray holder for one or more long grill briquettes, and wherein the one or more long grill briquettes are rotatable.

At item 9 the apparatus of item 8 further comprising a brick lined surface in proximity to the transfer area.

At item 10 the apparatus of item 4 wherein the fire box bottom, first and second side, and back are brick lined.

At item 11 the apparatus of item 10 wherein the fire box top is open and in proximity to a roof having a chimney.

At item 12 a grilling apparatus comprising: a main grilling enclosure having a main grilling area, the main grilling area having a brick lined bottom; a main fire box enclosure having portions of the main fire box enclosure brick lined and wherein the main fire box enclosure and the main grilling enclosure are fixedly attached to each other; the main fire box enclosure having an openable door that opens frontward, the openable door being insulated, and an openable top; and the main grilling enclosure having an openable top.

At item 13 the grilling apparatus of item 12 further comprising a crank mechanism having a handle and ratchet with a releasable pawl.

At item 14 the grilling apparatus of item 13 wherein said crank mechanism can raise or lower a grilling surface with respect to a bed of charcoal being used to cook or a gas burner assembly being used to cook.

At item 15 the grilling apparatus of item 12 further comprising an opening between the main grilling enclosure and the main fire box, the opening of sufficient size to allow charcoal located in the main fire box to be moved into the main grilling area.

At item 16 the grilling apparatus of item 15 wherein the opening is located proximate to the bottom of the main grilling enclosure, and proximate to the bottom of the main fire box.

At item 17 the grilling apparatus of item 16 wherein a tool is used to move the charcoal located in the main fire box to the main grilling area.

At item 18 the grilling apparatus of item 13 further comprising a door that extends from below the brick lined bottom of the main grilling area to above a top of the brick lined bottom of the main grilling area.

At item 19 the grilling apparatus of item 18 wherein the door further is at least as wide as the brick lined bottom of the main grilling area.

At 20 a method comprising: sliding from a shelf of a multi fuel grill structure a gas burner assembly, the gas burner assembly comprising burners, control valves, and an ignition; and positioning the gas burner assembly in the multi fuel grill structure above the shelf.

Thus a Method and Apparatus for Multi-Fuel Grill have been described.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

As used in this description, "brick" or "brick lined" or similar phrases means a heat resistant material.

As used in this description, "ceramic grill briquette" or similar phrases means a briquette that is made of a material that does not burn at the temperatures encountered but rather acts as a heated radiating source of diffuse heat. For example, but not limited to, a ceramic grill briquette may be made of ceramic, may be made of lava rock, may be made of metal, or any combination thereof, etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "substantially" or "substantially equal" or similar phrases are used to indicate that the items are very close or similar. Since two physical entities can never be exactly equal, a phrase such as "substantially equal" is used to indicate that they are for all practical purposes equal.

It is to be understood that in any one or more embodiments of the invention where alternative approaches or techniques are discussed that any and all such combinations as may be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus a Method and Apparatus for Multi-Fuel Grill have been described.

What is claimed is:

1. A grilling apparatus comprising:
   a fire box, the fire box having a first side, a second side, a back side, a top, a bottom, and a front side;
   the front side of the fire box having a hinged door that opens outward away from an interior of the fire box;
   a main grilling area in the grilling apparatus, the grilling apparatus using a bed of charcoal, wood, or logs, or gas, for cooking;
   the main grilling area having a surface;
   the fire box next to the main grilling area;
   the fire box first side having an opening to the main grilling area, the opening next to the fire box bottom;
   a shelf located below the main grilling area;
   the shelf for storage of a moveable gas burner assembly, the moveable gas burner assembly comprising burners, control valves, and an ignition; and
   the moveable gas burner assembly sized so that it can be positioned on the main grilling area.

2. The grilling apparatus of claim 1 further comprising:
   the fire box for holding charcoal or wood or logs;
   a transfer area from the opening in the fire box first side to the surface of the main grilling area; and
   the moveable gas burner assembly located next to the transfer area when gas is in use or located on the shelf for storage when charcoal or wood or logs is in use.

3. The apparatus of claim 2 wherein the fire box front side comprises a first door and a second door, the first door larger in size than the second door, and the first door located vertically above the second door.

4. The apparatus of claim 3 wherein the transfer area is next to the second door.

5. The apparatus of claim 2 wherein the opening is of sufficient width and height to allow charcoal, wood, or logs in the fire box to be transferred to the transfer area using a tool.

6. The apparatus of claim 2 wherein the fire box top has a top opening and wherein a metal screen covers the fire box top opening.

7. The apparatus of claim 2 further comprising a fire box grate riser which sits on the fire box bottom.

8. The apparatus of claim 2 further comprising a gas lighter pipe with a mixing chamber located in a lower portion of the fire box.

9. The apparatus of claim 2 wherein the moveable gas burner assembly further comprises at least two wheels.

10. The apparatus of claim 2 further comprising a food stand with legs which sit on the fire box bottom and the food stand having a top surface elevated above the fire box bottom.

11. The apparatus of claim 5 wherein the fire box bottom, first and second side, and back are brick lined.

12. The apparatus of claim 11 wherein the fire box top is open and next to a roof having a chimney.

13. The grilling apparatus of claim 1 further comprising:
   the main grilling area having a brick lined bottom;
   the fire box having portions brick lined and wherein the fire box and the main grilling area are fixedly attached to each other;
   the hinged door being insulated, and the fire box top openable;
   an openable top located above the main grilling area;
   a crank mechanism raises or lowers a grilling surface with respect to a bed of charcoal or wood or logs being used to cook or a gas burner assembly being used to cook; and
   wherein the grilling surface has V-shaped members angled from back to front to allow grease from food to flow forward to a removable grease collector.

14. The grilling apparatus of claim 13 further comprising a grease collection can that captures grease from the removable grease collector.

15. The grilling apparatus of claim 13 further comprising openings in the fire box to accommodate a removable surface that protrudes horizontally forward from the fire box.

16. The grilling apparatus of claim 13, further comprising a transfer opening between the main grilling area and the fire box, the transfer opening of sufficient size to allow charcoal or wood or logs located in the fire box to be moved onto the main grilling area.

17. The grilling apparatus of claim 16 wherein the transfer opening is located next to the bottom of the main grilling area, and next to the bottom of the fire box.

18. The grilling apparatus of claim 17 further comprising a transfer door that can be placed or closed to block the transfer opening.

19. The grilling apparatus of claim 14 further comprising a door that extends from below the brick lined bottom of the main grilling area to above a top of the brick lined bottom of the main grilling area, wherein the door is hinged at top corners and swings outward and up from the brick lined bottom of the main grilling area.

20. The grilling apparatus of claim 19 wherein the door is a single piece, or one or more pieces hingedly attached, and further the door is at least as wide as the brick lined bottom of the main grilling area.

* * * * *